US005705577A

United States Patent [19]
Rossi et al.

[11] Patent Number: 5,705,577
[45] Date of Patent: Jan. 6, 1998

[54] DILUTE PROCESS FOR THE POLYMERIZATION OF ETHYLENE/α-OLEFIN COPOLYMER USING METALLOCENE CATALYST SYSTEMS

[75] Inventors: Albert Rossi, Warren, N.J.; Salvatore Rea, Franklin Square, N.Y.; Jon Edmond Stanat, Westfield, N.J.; Linda Kay Wright, Somerville, N.J.; Kenneth Lee Kaufman, Teaneck, N.J.; Harold Wilbur Margo, Colonia, N.J.; Jeffery William Frederick, Morris Plains, N.J.; Robert Martin Koros, Westfield, N.J.

[73] Assignee: Exxon Chemical Patents Inc., Linden, N.J.

[21] Appl. No.: 652,185

[22] Filed: May 23, 1996

Related U.S. Application Data

[63] Continuation of Ser. No. 260,862, Jun. 16, 1994, abandoned, which is a continuation of Ser. No. 992,690, Dec. 17, 1992, abandoned.

[51] Int. Cl.$^6$ ................................................. C08F 2/06
[52] U.S. Cl. .............................. 526/68; 526/69; 526/70; 526/127; 526/160; 526/170; 526/290; 526/348.5; 526/348.6; 526/943
[58] Field of Search .................................. 526/68, 69, 70, 526/160, 170, 127, 290, 348.5, 943, 348.6

[56] References Cited

U.S. PATENT DOCUMENTS

| | | | |
|---|---|---|---|
| 3,637,616 | 1/1972 | Pettersen | 260/80.78 |
| 3,706,719 | 12/1972 | Goffinet, Jr. | 260/80.78 |
| 3,912,698 | 10/1975 | Shurts | 260/80.78 |
| 4,542,199 | 9/1985 | Kaminsky et al. | 526/160 |
| 4,668,834 | 5/1987 | Rim et al. | 585/12 |
| 4,704,491 | 11/1987 | Tsutsui et al. | 585/10 |
| 4,888,393 | 12/1989 | Cesare et al. | 525/285 |
| 5,017,299 | 5/1991 | Gutierrez et al. | 252/51.5 R |
| 5,023,388 | 6/1991 | Lüker | 585/9 |
| 5,084,534 | 1/1992 | Welborn, Jr. et al. | 526/160 |
| 5,128,056 | 7/1992 | Gutierrez et al. | 252/51.005 A |
| 5,151,204 | 9/1992 | Struglinski | 252/52 R |

FOREIGN PATENT DOCUMENTS

| | | | |
|---|---|---|---|
| 0 129 368 A1 | 12/1984 | European Pat. Off. | |
| 200351 | 11/1986 | European Pat. Off. | C08F 210/16 |
| 0 260 999 A1 | 3/1988 | European Pat. Off. | |
| 0 270 339 A2 | 6/1988 | European Pat. Off. | |
| 0 366 212 A1 | 5/1990 | European Pat. Off. | |
| 0 440 504 A2 | 8/1991 | European Pat. Off. | |
| 0 440 505 A2 | 8/1991 | European Pat. Off. | |
| 0 440 506 A2 | 8/1991 | European Pat. Off. | |
| 0 440 507 A2 | 8/1991 | European Pat. Off. | |
| 0 440 508 A2 | 8/1991 | European Pat. Off. | |
| 0 441 548 A1 | 8/1991 | European Pat. Off. | |
| 440507 | 8/1991 | European Pat. Off. | |
| 0 447 035 A2 | 9/1991 | European Pat. Off. | |
| 552946 | 7/1993 | European Pat. Off. | C08F 210/18 |
| Hei 2-173110 | 7/1990 | Japan | |
| 90/01503 | 2/1990 | WIPO | |
| WO 90/01503 | 2/1990 | WIPO | |
| WO 91/11488 | 8/1991 | WIPO | |
| WO 92/14766 | 9/1992 | WIPO | |
| WO 93/08221 | 4/1993 | WIPO | C08F 210/00 |

OTHER PUBLICATIONS

"Modern Size–Exclusion Liquid Chromatography", W.W. Yau, J.J. Kirkland and D.D. Bly, John Wiley and Sons, New York, 1979, pp. 5–13.

*Primary Examiner*—David W. Wu
*Attorney, Agent, or Firm*—Harvey L. Cohen

[57] ABSTRACT

An improved process for the copolymerization of ethylene and α-olefins utilizing highly dilute α-olefin feedstreams to effect high conversions and catalyst productivities. The instant invention is particularly adaptable to copolymerizing the α-olefin content of commercially available refinery feedstreams such as Raffinate-2.

30 Claims, 5 Drawing Sheets

DILUTE PROCESS FOR THE POLYMERIZATION OF ETHYLENE/α-OLEFIN COPOLYMER USING METALLOCENE CATALYST SYSTEMS

This is a continuation of application Ser. No. 08/260,862, filed Jun. 16, 1994, now abandoned, which is a continuation of application Ser. No. 07/992,690, filed Dec. 17, 1992, now abandoned.

BACKGROUND OF THE INVENTION

The present invention relates to a continuous process for the polymerization of ethylene and α-olefins with a metallocene catalyst system using a dilute α-olefin feed.

Olefin polymerizations, particularly, ethylene/α-olefin copolymerizations can be broadly differentiated as occurring in solution, suspension, or in the gas phase.

Within the continuous solution polymerization category, operating conditions can vary quite broadly depending on such variables as the concentration of the reactants in the total feed, the nature of the catalyst system employed, the desired molecular weight of the polymer, and the desired monomer/comonomer ratio within the final polymer.

When concentrated ethylene and α-olefins, e.g., propylene, feeds are copolymerized with conventional Ziegler-Natta catalysts, it is known as described in U.S. Pat. Nos. 3,912,698 and 3,637,616 to conduct such polymerizations continuously to obtain an ethylene copolymer, dissolved in the solvent, which is continuously removed and isolated by known means. Unreacted monomers leaving the reactor are recovered and recycled to the reactor along with fresh monomers to replace those polymerized.

It is also known, as in EPA 270,339, to conduct continuous ethylene/α-olefin copolymerization under highly dilute conditions at atmospheric pressure using conventional Ziegler-Natta catalysts. These processes suffer the drawback that the catalysts exhibit low productivities and produce polymer product exhibiting large molecular weight distributions, high ash content, and number average molecular weights too large to be useful as lubricant additives. Consequently, if low molecular weight polymers are desired either hydrogen must be used to keep the molecular weight of the product low, e.g. less than about 15,000 or the catalyst concentration has to be increased to extremely high levels to obtain low molecular weights. The hydrogen treatment at least partially saturates the terminal double bonds in the product, thereby significantly reducing or destroying the polymer's utility for most functionalization reactions, e.g., those used in the production of dispersants.

Saturated polymers have limited applicability for use in subsequent fuctionalization techniques (e.g., by "ene" reaction with maleic anhydride) which rely on a high terminal double bond content to achieve functionalization.

In contrast, recent developments in the catalyst and ethylene/α-olefin (EAO) copolymer art disclose that metallocene catalyst systems yield low molecular weight polymers with high terminal ethenylidine (vinylidene) content directly, without hydrogenation, as well as other advantageous properties (see, EP Publication Nos. 129,368; 440,504; 440,505; 440,506; 440,507; 440,508; 441,548; PCT Publication Nos. WO 91/11488; WO 90/01503; and U.S. Pat. Nos. 5,017,299; 5,128,056; 5,151,204; 4,704,491; 4,668,834; 4,888,393; and 4,542,199).

More specifically, it is known in the art to employ high pressure/high temperature systems, as in U.S. Pat. No. 5,084,534 and EP Publication 260,999, which utilize pure or nearly pure feeds and metallocene catalyst at pressures up to 2,500 bar and temperatures up to 300° C. Such systems are designed to produce high molecular weight polymers at high catalyst productivities (i.e. grams of polymer produced per gram of catalyst used). These systems suffer a number of drawbacks when applied to low molecular weight polymer production. Most notably, these systems utilize expensive pure feeds and specialized equipment resulting in high fixed costs of production.

Also, such systems operate at a single phase to allow efficient mixing of the reactants and, therefore, homogeneity of the product. A single phase system is achieved by operating at temperatures and pressures sufficiently high to compress the ethylene and make it dense enough to dissolve the polymer product therein. This produces a homogeneous solution of polymer in reactant. To achieve high temperature and reduce the size of the reaction zone the process is run adiabatically (heat is not removed), making temperature control difficult. Since the molecular weight of the product is directly related to temperature, failure to maintain constant temperature throughout the reaction process results in increased polydispersity (or Molecular Weight Distribution, MWD). Temperature control becomes increasingly more difficult at higher conversions in an adiabatic system. Consequently, conversions in the high temperature/high pressure process are kept to a minimum.

For polymers having molecular weight of 100,000 or more, variations of ±1,000 or so have little effect on MWD. For polymers on the order of 10,000 molecular weight and below, however, such variations are extremely disadvantageous.

Moreover, the use of pure feeds is another limiting factor on the rate of conversion. As the conversion rate in a pure feed system is increased, the concentration of polymer in the reactor increases until it becomes extremely difficult or impossible to mix and pump the reactants efficiently. This problem is particularly exacerbated at a low reaction temperature where the viscosity of the polymer increases even further. The limitations on conversion induced by pure feeds applies to essentially all polymerization processes.

Typically, a low conversion system requires the recycling of ethylene and comonomer out of the product stream and back into the reactor.

Such a recycle system is disclosed in PCT Application No. EP92/00377 (Publication No. WO 92/14766) wherein unreacted ethylene must be separated out of the product stream and then repressurized into the reactor vessel. However, since catalyst appears in this recycle and ethylene is extremely self-reactive, the problem of ethylenic polymerization arises, thereby necessitating the use of a catalyst "killer" that can suppress polymerization in the recycle.

Such a "killer" is not needed in the present invention since the improved mass transfer associated with large quantities of diluent ensure that at least 90 percent of the ethylene will be converted. Hence, little or no ethylene appears in the product output stream. The only process akin to a "recycle" in the present invention is the use of a reflux condenser in the preferred boiling reactor embodiment. This still poses no difficulty, as metallocene catalyst systems will not vaporize into the vapor space of a boiling reactor and therefore do not appear in the reflux.

Others have attempted to prepare low molecular weight EAO at low temperature and pressure, with metallocene catalyst as described in U.S. Pat. No. 4,704,491 to Mitsui Petrochemical Industries and U.S. Pat. No. 4,668,834 to Uniroyal.

The process described in the Mitsui 4,704,491 patent operates with high catalyst concentrations, e.g., $10^{-2}$ moles/liter, pure undiluted vaporized feeds, at atmospheric pressure, extremely short reactant residence time (e.g., about 0.5 hours), with no recycle of unreacted reactants. The high catalyst concentrations are needed because the mass transfer of the reactants into solution is poor and, consequently, low concentrations of reactants appear in solution. Low conversions are the result.

The Uniroyal U.S. Pat. No. 4,668,834 operates at super atmospheric pressure with a compressor driven cooling system and pure undiluted feeds.

Methods employing dilute reaction mixtures and utilizing batch processes are known in the art. Typically, dilution of the reaction mixture occurs as a result of employing a metallocene catalyst system in a diluent, usually toluene.

However, the use of a dilute feed of $\alpha$-olefin is not found in this art. Moreover, rapid introduction of reactants into solution is often accomplished by introducing the pure reactants directly into the vapor space of the reactor instead of the liquid phase, or by bubbling the reactants up through the reaction mixture at pressures too low to provide effective dissolution therein. Such processes are also conducted at very low monomer conversions.

KAMINSKY, et al., U.S. Pat. No. 4,542,199, describes a batch process wherein pure ethylene and an $\alpha$-olefin are introduced into a pressure vessel containing a metallocene dissolved in toluene.

LUKER, U.S. Pat. No. 5,023,388 refers to a batch process, wherein the metallocene is dissolved in diesel oil in the presence of large quantities of $\alpha$-olefin and ethylene and hydrogen gas at 7 bar. The molecular weight distribution of the product is reported to be 2.8.

SLAUGH, et al., EP 366, 212 published May 2, 1990, teaches continuous or batch processes, though the examples offered are all batch. The feeds used are pure and the reaction mixture is highly concentrated. The process produces polymer wherein 80 percent of the product has less than 20 carbon atoms per molecule.

TSUTSUI, et al., EP 447,035 published Sep. 18, 1991, refers to a series of batch processes, wherein ethylene is first polymerized or copolymerized with $\alpha$-olefin in a first batch under concentrated or dilute conditions; the product is isolated; and then the product is introduced into a subsequent batch process with ethylene or an $\alpha$-olefin. The process may be continued to a third round of batch processing. Reactants may be relatively concentrated in one batch, yet relatively dilute in the next or vice-versa.

Another approach, as described by HIROSE, et al., JP 2-173,110 disclosed Jul. 4, 1990, is to recycle massive amounts of ethylene and propylene gas through a solvent-containing reaction vessel. The feeds are pure and the quantity of reactants to solvent is very high.

The ratio of ethylene to $\alpha$-olefin is necessarily very low in order to prevent polyethylene formation. Polymers formed by this process have ethylene contents less than 10 percent by mole.

It is also known in the art to cool polymerization reactors by evaporation and removal of unreacted monomers from the vapor space, these monomers, being optionally cooled, and recycled to the reactor. Reactors cooled in this manner are referred to as evaporatively cooled reactors or boiling reactors. Polymer is recovered from the reaction mixture by withdrawing polymer solution from the reactor and separating unreacted monomers which are usually recycled to the reactor.

Also, as a general proposition, as the concentration of the polymer in solution increases, and/or the molecular weight of the polymer increases, the viscosity of the reaction mixture increases.

This in turn reduces the mass transfer of ethylene from the gas into the liquid phase and reduces the heat transfer properties of the reaction mixture thereby making it more difficult to cool the reaction mixture.

As indicated above, failure to maintain a stable reaction temperature leads to fluctuations in the molecular weight of the polymer and a broadening of the molecular weight distribution.

While evaporative cooling reactors improve heat transfer by removing the exothermic heat of reaction, and can maintain stable reaction temperatures, they have the disadvantage that ethylene concentration in solution in the reactor is usually less than its equilibrium value (i.e., ethylene is continually being quickly removed and recycled). Thus, as a general proposition, in order to produce a copolymer containing a particular proportion of ethylene in evaporatively cooled reactors, it is usually necessary to recycle a larger amount of ethylene in the reactor off-gas (to obtain the cooling benefit) than would be the case if a sealed reactor were employed and the concentration of ethylene in solution in the reactor achieved its equilibrium value. Economically, this increase in recycle volume means greater expense than would otherwise be the case. See U.S. Pat. No. 3,706,719.

Moreover, if the reaction temperature is increased (e.g. above the critical temperature of ethylene at 9.2° C. (48.5° F.)), the ethylene mass transfer problem becomes more acute since the solubility of ethylene will be more difficult, thereby reducing gas/liquid phase mixing.

In addition to ethylene imbalance in the vapor space and mass transfer problems, evaporatively cooled reactors also lead to the associated problem of reactor fouling and polyethylene segment formation.

More specifically, because ethylene and $\alpha$-olefins possess different reactivities, they copolymerize at different rates.

Moreover, because ethylene reacts with itself so much faster than with $\alpha$-olefins, the copolymerization of ethylene with $\alpha$-olefins can result in polymers having large crystalline polyethylene segments randomly interspersed with occasional $\alpha$-olefin moieties.

These phenomena not only make it difficult to control the ethylene content in the polymer, reduce the solubility of the polymer in the reaction mixture, and consequently lead to reactor fouling, but also more importantly, they limit the utility of the polymer in applications extremely sensitive to crystallinity such as to make dispersants for lubricating oil compositions.

The conventional solution to controlling polymer ethylene content, when using Ziegler-Natta catalysts, has been to regulate the concentrations of ethylene and $\alpha$-olefin in the reaction mixture.

For example, to obtain a copolymer of ethylene and propylene having approximately 50 mole percent of each monomer in the copolymer, it has been considered that a large excess of propylene, e.g., greater than 10:1 mole ratio, is necessary in the catalyst-containing solution in the reactor.

In contrast, a copolymerization conducted in a solution containing about equal amounts of ethylene and propylene, produces a copolymer so high in ethylene content, that under ordinary Ziegler-Natta polymerization conditions, e.g., about −20° to about 80° C., it would not be soluble in the saturated hydrocarbon solvents used as the polymerization medium.

However, when ethylene and propylene, for example, are polymerized in a reactor having both liquid and vapor phases, the mole or weight ratio of propylene to ethylene in the vapor phase is typically far less than the corresponding propylene to ethylene ratio in the liquid phase because of the greater volatility of ethylene. For example, if the propylene to ethylene mole ratio in the liquid phase is about 10:1, the propylene to ethylene mole ratio in the vapor phase above it may be only about 1:1 to about 3:1.

Uniformity of ethylene monomer incorporation, known as "compositional distribution", is also a function of the mass transfer of ethylene into the reaction zone, i.e., uniform mixing of the co-monomers.

However, as discussed above, in those reactor designs which employ recycle of the vapor phase, e.g., using a reflux condenser, the reflux condensate returning to the reactor will typically have sufficiently high ethylene concentrations that reactor agitation of fresh and recycled ethylene alone will not suffice to prevent insoluble polymers having randomly high ethylene content from forming and clogging up the system.

Consequently, it has been conventional in the art to attempt to introduce process steps for reducing the ethylene content in the recycled condensate, e.g., by removing ethylene from the condensate before introduction into the polymerization reactor. See U.S. Pat. No. 3,706,719 (col. 5, line 68 et seq.); U.S. Pat. Nos. 3,637,616; and 3,912,698. Such steps are costly and inefficient.

Separate and distinct from the need to control monomer ratio in the recycle stream are the mass transfer problems associated with employing pure feeds, particularly mixed pure feeds, even when supplied to reaction zones employing a solvent which dilutes the pure feed as it is introduced into the reactor. For example, the introduction of pure feeds into liquid reaction mixtures necessarily creates a higher concentration gradient of monomer at its point of introduction relative to the remainder of the reactor. Thus a finite amount of time will be required to achieve uniform mixing of the monomer into the reaction mixture. As long as this higher concentration gradient exists, there will be a propensity to form higher molecular weight polymer species relative to the molecular weight of polymer species formed at monomer equilibrium concentrations, since molecular weight is a function of monomer concentration. Broadened MWD and non-uniform compositional distribution are a result.

In view of the above, there has been a continuing need to develop more cost efficient processes for preparing EAO copolymers with metallocene catalyst systems.

The present invention was developed in response to this need.

SUMMARY OF THE INVENTION

The use of dilute monomer feeds in accordance with the present invention necessarily starts at a lower concentration gradient at the point of monomer introduction into the reactor. Consequently, less time is required to achieve uniform monomer mixing and less time is available for higher molecular weight species formation at the input port. This represents a significant advantage even absent recycle of unreacted monomer.

Moreover, the use of dilute feeds enables the process to operate at high conversion rates of ethylene/α-olefin without the attendant buildup of mass transfer resistance attributable to polymer formation in pure feed systems.

In the preferred embodiment of the process of the present invention employing a boiling reactor, the use of a dilute feed enables the employment of a system wherein the ethylene in the vapor space and in the liquid reaction mixture are in equilibrium. This is achievable because the reaction mixture gives essentially no mass transfer resistance at the liquid/vapor interface because uniform mixing is easily obtained.

The high conversion obtainable with a metallocene catalyst system permits sufficient reaction of the ethylene as it travels through the reactor that the amount of unreacted ethylene entering the vapor space and in equilibrium with dissolved ethylene is minimized. Consequently, because high ethylene vapor buildup is minimized, recycle of ethylene is facilitated and does not hinder recycle of the α-olefin.

Still further improvements are made possible by employing a feed diluent, such that the major constituents of the diluent boil at about the same temperature as the α-olefin to be copolymerized with ethylene. Accordingly, not only is the ethylene content in the vapor space low to begin with (as discussed above) but it is further diluted by the α-olefin feed constituents, a major portion of which is diluent. Thus, the evaporative cooling does not depend on recycle of high amounts of ethylene in the vapor, ethylene buildup in the reflux is further minimized, and mass transfer resistance to ethylene mixing is further reduced.

Moreover, since the more volatile ethylene is also more reactive than the α-olefin monomer, the proportion of olefin monomer to ethylene is typically greater in the vapor space than in the feed, but occasionally may be equal to or only slightly less than that in the feed. Also, the concentration of ethylene in the vapor space is typically less than that in the feed. Hence, fouling caused by ethylene build-up at the reflux return port and attendant polyethylene formation is easily avoided.

Thus, not only is manipulation of the condensed vapor to alter its compositional distribution not necessary, but the uniformity of polymer is greatly enhanced.

In addition to the above advantages, the combined use of dilute feed and high conversion facilitates removal of catalyst (deashing) residue and quenching of the polymer/catalyst mixture since it is easier to mix the polymer with deashing and quench media.

Utilization by the present invention of dilute α-olefin containing feeds and high conversion not only permits adaptation of metallocene chemistries to evaporatively cooled reactors as described herein, but it also allows for a significant improvement in the overall economics of the process because such dilute feeds can be readily obtained at very low cost as by-product waste streams derived from other commercial sources.

DETAILED DESCRIPTION OF THE INVENTION

Figure 1:
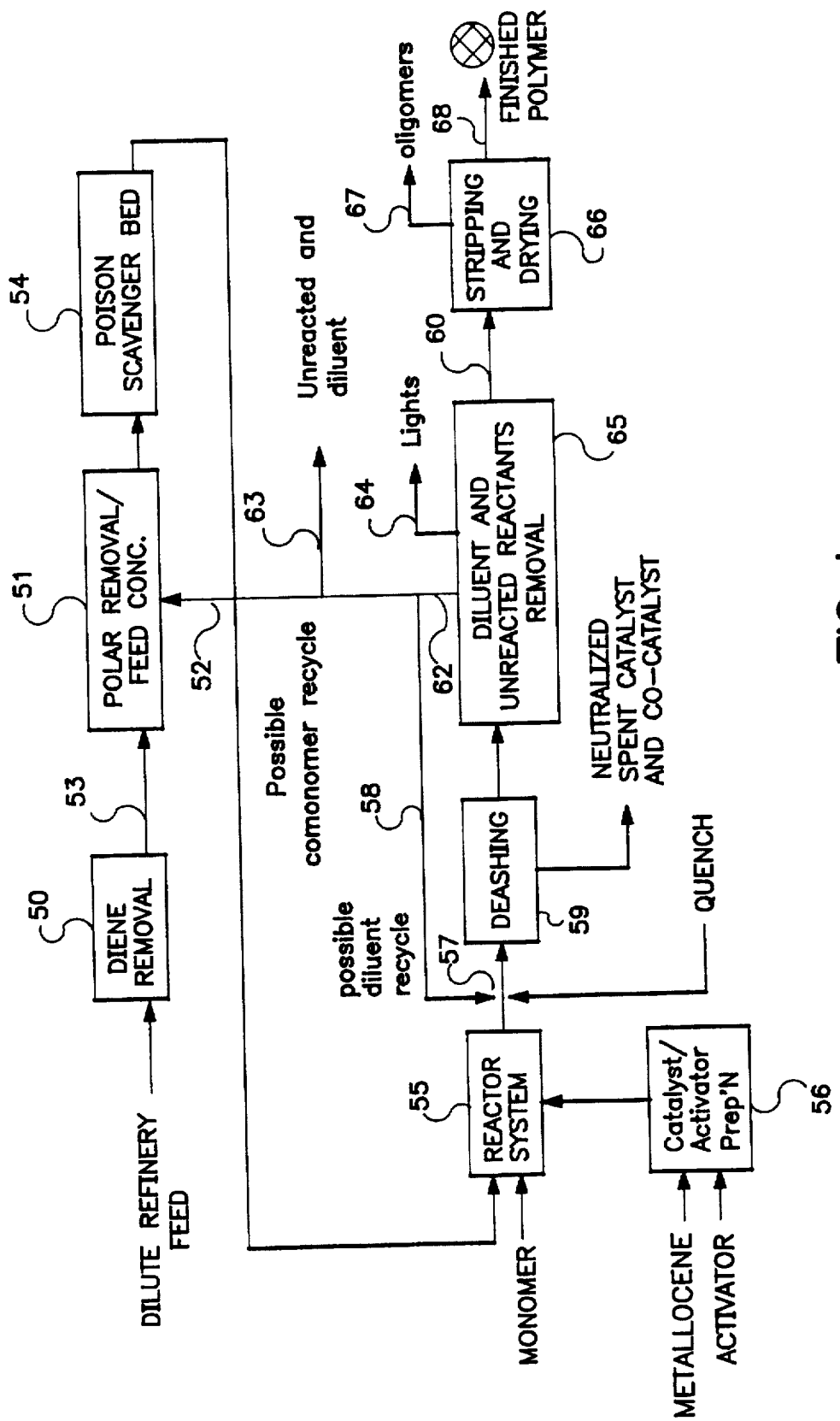
FIG. 1 is a flow diagram of the dilute feed polymer process.

Polymers produced in accordance with the process of the present invention are polymers comprising monomer units derived from ethylene, and at least one α-olefin. Such monomers are characterized by the presence within their structure of at least one ethylenically unsaturated group of the structure >C=CH$_2$. In addition, they are highly reactive at low catalyst concentrations. Metallocene catalyzed polymerizations are particularly adaptable for use with α-olefin monomers which:

a) have at least one hydrogen on the 2-carbon (hence, isobutylene polymerizes extremely poorly);
b) have at least two hydrogens on the 3-carbon;
c) have at least one hydrogen on the 4-carbon.

Accordingly, suitable α-olefin monomers include those represented by the structural formula H$_2$C=CHR$^1$ wherein R$^1$ is straight chain or branched chain alkyl radical comprising 1 to 18 carbon atoms and wherein the polymer formed therefrom contains a high degree of terminal ethenylidene unsaturation. Preferably R$^1$ in the above formula is alkyl of from 1 to 8 carbon atoms, and more preferably is alkyl of from 1 to 2 carbon atoms. Therefore, useful comonomers with ethylene include propylene, butene-1, pentene-1, 4-methylpentene-1, hexene-1, octene-1, decene-1, dodecene-1, tridecene-1, tetradecene-1, pentadecene-1, hexadecene-1, heptadecene-1, octadecene-1, nonadecene-1 and mixtures thereof (e.g., mixtures of propylene and butene-1, and the like).

The ethylene content of the polymers prepared in accordance with this invention is preferably in the range of between about 5 and about 70 (e.g., 11 to 70 wt. %) wt. %, and more preferably between about 15 and about 50 (e.g. 15 to 45) wt. %.

The process of the present invention is controlled to make polymer having a number average molecular weight of not greater than about 15,000 and typically from about 300 to about 15,000 (e.g., from 300 to 10,000), preferably from about 900 to about 8,000; more preferably from about 1,000 to about 5,000 (e.g., from about 1,000 to about 3,000).

The number average molecular weight for such polymers can be determined by several known techniques. A convenient method for such determination is by size exclusion chromatography (also known as gel permeation chromatography (GPC)) which additionally provides molecular weight distribution information, see W. W. Yau, J. J. Kirkland and D. D. Bly, "Modern Size Exclusion Liquid Chromatography", John Wiley and Sons, New York, 1979.

The polymers produced in the process of this invention preferably exhibit a degree of crystallinity such that they are essentially amorphous.

The polymers produced in this invention are further characterized in that up to about 95% or more of the polymer chains possess terminal ethenylidene-type unsaturation. Thus, one end of such polymers will be of the formula POLY-C(T$^1$)=CH$_2$ wherein T$^1$ is C$_1$ to C$_{18}$ alkyl, preferably C$_1$ to C$_8$ alkyl, and more preferably C$_1$ to C$_2$ alkyl, (e.g., methyl or ethyl) and wherein POLY represents the polymer chain. The chain length of the T$^1$ alkyl group will vary depending on the comonomer(s) selected for use in the polymerization. A minor amount of the polymer chains can contain terminal vinyl unsaturation, i.e. POLY-CH=CH$_2$, and a portion of the polymers can contain internal monounsaturation, e.g. POLY-C(T$^1$)=CH(T$^2$), wherein T$^1$ and T$^2$ are as defined for T$^1$ above.

The polymer produced in this invention comprises polymer chains which can be saturated by hydrogen but preferably contain polymer chains wherein at least about 30, preferably at least about 50, more preferably at least about 60, and most preferably at least about 75 percent (e.g. 75–98%), of which exhibit terminal ethenylidene (vinylidene) unsaturation. The percentage of polymer chains exhibiting terminal ethenylidene unsaturation may be determined by FTIR spectroscopic analysis, titration, HNMR, or C$^{13}$NMR.

The molecular weight distribution (Mw/Mn) of the copolymers will be typically less than about 5, preferably less than about 4, and most preferably less than about 3, e.g. between 1.5 and 2.5.

The preferred α-olefin monomers derived from dilute α-olefin containing refinery streams, such as Raffinate-2, are butene-1 and propylene. Most preferred is the copolymerization of butene-1 with ethylene for the production of ethylene/butene-1 polymers (hereinafter referred to as EB or EB-1 Polymers) useful in the manufacture of dispersants. The advantages of such copolymers may be found in commonly assigned U.S. Ser. No. 992,192filed Dec. 17, 1992, now abandoned, entitled "Polymers Derived from Ethylene and Butene-1 for Use in the Preparation of Lubricant Dispersant Additives" filed on an even date herewith, (Docket No.: PT-944) the disclosures of which are hereby incorporated by reference.

The ethylene content of the most preferred EB polymers is typically in the range of from about 15 to 50 (e.g. 17 to about 50), more preferably from about 15 to about 48 (e.g. 30 to about 45), and or more preferably from about 17 to 45 (e.g. 17 to about 30) weight percent. The balance of the polymer content is substantially based upon units derived from butene-1. Thus, the butene-1 content is typically from about 95 to about 50 (e.g., 90 to about 50), more preferably from about 95 to about 55 (95 to about 65), and most preferably from about 90 to about 65 (e.g. 90 to about 70) weight percent based on the total polymer weight. However, the EB polymers of this invention may optionally contain minor or trace amounts (e.g. up to about 5 wt. %) of olefins other than ethylene and butene-1 since the reactant streams which may be used to prepare the EB polymers may contain such olefins as isobutylene, isopentene, butene-2, and butadiene. Similar considerations apply for other than EB copolymerization as well.

The process of the present invention utilizes a metallocene catalyst system. Such metallocenes are extremely unreactive with non-terminal olefins, and terminal olefins which lack at least one hydrogen atom on the second carbon (e.g., isobutylene), at least two hydrogens on the third carbon (e.g., isopentene), or at least one hydrogen on the fourth carbon (e.g., 4,4-dimethylpentene-1).

Hence, as described hereinafter, many of the components in refinery streams, such as Raffinate-2 (e.g. 2-butenes, and isobutylene) are essentially non-reactive in a metallocene system and become suitable diluents for use in the present process which need not be separated from the feed. Other constituents such as butadiene are made non-reactive or non-poisonous by pre-saturating the double bonds with hydrogen.

Metallocene Catalyst System—General Description
Metallocene Catalyst Systems

The process of this invention can be utilized with catalyst which in general may be any ligand stabilized hydrolyzable di- or poly-alkyl or hydride complex of a transition metal. These complexes may be converted into a reactive coordinatively unsaturated alkyl or hydride cationic complex by reaction with an activator composition to form a more preferred metallocene catalyst system but the term "catalyst system" is used herein to embrace a transition metal component with or without an activator component. The transition metal complex is catalytically active for polymerization of olefins or ethylenically unsaturated monomers such as ethylene, propylene, 1-butene and ethylenically unsaturated aromatic monomers such as styrene.

For the olefin polymerization catalyst, the transition metal catalyst precursor is represented by the formula $$(LS)ZX_1X_2 \quad (1)$$

wherein Z is a group 3 to Group 10 transition metal; $X_1$ is a leaving group which may be an anionic ligand or a non-coordinating anion; $X_2$ is hydride or a hydrocarbyl radical; and (LS) is a ligand system comprised of one or more ancillary ligands sufficient to complete the coordination number of Z.

For an olefin polymerization catalyst the transition metal catalyst precursor compounds may be any transition metal compound which heretofore has been activatable to a catalytic state for olefin polymerization by an alumoxane. Such transition metal catalyst precursor compounds thus include (but are not limited to) the Group 4, 5 and 6 metal hydrocarbyloxides as described in U.S. Pat. No. 5,079,205 represented by the formulae:

$$M(OR^1)_y X_{n-y'} \quad (2)$$

$$M(OR^1)(OR^1)_{y-2} X_{n-y'} \quad \text{or} \quad (3)$$

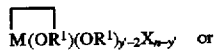

$$(R^1O)M(OR^1)(OR^1)_{y-4} X_{n-y'}$$

wherein M is a Group IVB, VB or VIB transition metal; each X is independently halogen, or a hydrocarbyl, alkoxy or amide group having from one to 30 carbon atoms; $R^1$ is a radical of the formula:

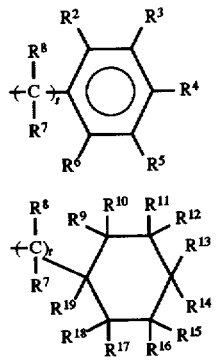

(4)

wherein "t" is an integer number of 0 to 10 and each of the $R^2$ to $R^{19}$ substituents are independently hydrogen, a halogen, a hydrocarbyl radical selected from the group consisting of a straight or branched chain alkyl group, an aryl group, an alkylaryl group, an arylalkyl group, a halogenated hydrocarbyl group, an alkoxy group, an amine group or at least two of the substituents $R^2$ to $R^6$ or $R^9$ to $R^{19}$ may be a single hydrocarbylene radical which forms a fused polycyclic ring system or polynuclear aromatic system, and $R^7$ and $R^8$ may independently be the same as the cyclic group, except when t=o then at least one of $R^2$–$R^6$ and $R^9$–$R^{19}$ is not hydrogen; "n" is a number at least equal to 4 and is equal to the valence of the transition metal M; "y" is a number equal to or greater than 2 and less than or equal to "n", "y" is a number equal to or greater than 3 and less than or equal to "n", and "y" is a number equal to or greater than 4 and less than or equal to "n"; the Group 4, 5 and 6 metal metallocenes as described in European Patent Application 0129368, represented by the general formula:

$$(C_5R'_m)_p R''_s (C_5R'_m) MeQ_{3-p} \quad (5)$$

or $$R''_s (C_5R'_m)_2 MeQ' \quad (6)$$

wherein Me is a Group 4b, 5b or 6b metal, $(C_5R'_m)$ is cyclopentadienyl or substituted cyclopentadienyl, each R' which can be of the same or different, is hydrogen, an alkyl, alkenyl, aryl, alkylaryl or arylalkyl radical having from 1 to 20 carbon atoms or two R' substituents together form a fused $C_4$–$C_6$ ring; R" is a $C_1$–$C_4$ alkylene radical, a dialkyl germanium or silicone or an alkyl phosphine or amine radical bridging two $(C_5R'_m)$ rings, each Q which can be the same or different, is aryl, alkyl, alkenyl, alkylaryl or arylalkyl radical having from 1 to 20 carbon atoms, s is 0 or 1, p is 0, 1 or 2; provided that s is 0 when p is 0; m is 4 when s is 1; m is 5 when s is 0; and that at least one R' is a hydrocarbyl radical when s=0 and Q is an alkyl radical or halogen; or those bridged silicon species as described in U.S. Pat. No. 5,017,714 and represented by the general formula

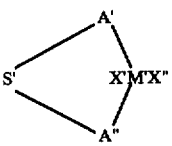

(6)

wherein M' is a Group IVB transition metal;

X' and X" are the same or different hydride, halogen, or hydrocarbyl or halohydrocarbyl having up to about 6 carbon atoms; A' and A" are the same or different asymmetrical mononuclear or polynuclear hydrocarbyl or silahydrocarbyl moieties; and S' is a bridge of 1–4 atoms selected from the group consisting of silanylene, silaalkylene, oxasilanylene and oxasilaalkylene.

Preferred metallocene components as represented by formula 6 are those compounds having a coordination bond between the transition metal (M') and at least one cyclopentadiene ring structure (A', A"). Cyclopentadiene ring structures include polycyclic structures such as indenyl and flourenyl which incorporate a five-membered ring.

Hence, the bridged silicon species may be represented by:

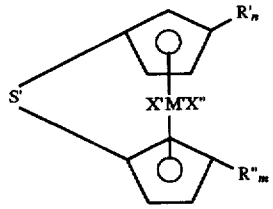

(7)

wherein M' is titanium, zirconium or hafnium; X' and X" are the same or different hydride, chlorine, bromine, iodine, or 1–6 carbon-atom alkyl, haloalkyl, aryl or haloaryl; n and m are the same or different integers from 1 to 4; R' and R" are the same or different hydrocarbyl or silahydrocarbyl of 1–20 carbon atoms, and 0–2 silicon atoms, or taken together, two or more of R' or of R" are hydrocarbylene or silahydrocarbylene of 1–20 carbon atoms and 0–2 silicon atoms; and S' is a chain of 0–4 carbon atoms and 1–2 silicon atoms selected from the group consisting of silanylene, silaalkylene, oxasilanylene and oxasilaalkylene.

Alternatively, the bridged silicon species may include the Group 4 metal monocyclopentadienyl-heteroatom ligand compounds as described in copending, commonly assigned, U.S. Ser. No. 07/720,282, now abandoned and represented by the general formula

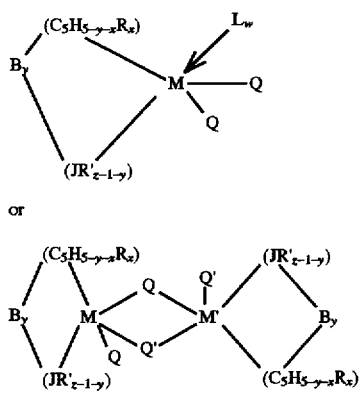

(8)

or (9)

wherein M is Zr, Hf or Ti;

($C_5H_{5-y-x}R_x$) is a cyclopentadienyl ring which is substituted with from zero to five groups R, "x" is 1, 2, 3, 4 or 5 denoting the degree of substitution, and each R is, independently, a radical selected from a group consisting of $C_1$–$C_{20}$ hydrocarbyl radicals, $C_1$–$C_{20}$ substituted hydrocarbyl radicals wherein one or more hydrogen atoms are replaced by a halogen atom, $C_1$–$C_{20}$ hydrocarbyl-substituted metalloid radicals wherein the metalloid is selected from the Group IV A of the Periodic Table of Elements, and halogen radicals or ($C_5H_{5-y-x}R_x$) is a cyclopentadienyl ring in which two adjacent R-groups are joined forming $C_4$–$C_{20}$ ring to give a saturated or unsaturated polycyclic cyclopentadienyl ligand;

($JR'_{z-1-y}$) is a heteroatom ligand in which J is an element with a coordination number of three from Group V A or an element with a coordination number of two from group Group V IA of the Periodic Table of Elements, each R' is, independently a radical selected from a group consisting of $C_1$–$C_{20}$ hydrocarbyl radicals, substituted $C_1$–$C_{20}$ hydrocarbyl radicals wherein one or more hydrogen atoms is replaced by a halogen atom, and "z" is the coordination number of the element J;

each Q is, independently any univalent anionic ligand or two Q's are a divalent anionic chelating agent;

"y" is 0 or 1 when w is greater than 0; y is 1 when w is 0, when "y" is 1. B is a covalent bridging group containing a Group IV A or VA element;

L is a Lewis base where "w" denotes a number from 0 to 3.

or represented by the formula:

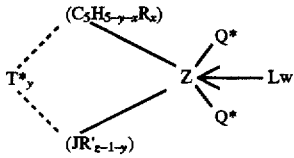

wherein Z is Zr, Hf or Ti in its highest formal oxidation state (+4, $d^0$ complex);

($C_5H_{4-x}R_x$) is a cyclopentadienyl ring which is substituted with from zero to four substituent groups R, "x" is 0, 1, 2, 3, or 4 denoting the degree of substitution, and each substituent group R is, independently, a radical selected from a group consisting of $C_1$–$C_{20}$ hydrocarbyl radicals, substituted $C_1$–$C_{20}$ hydrocarbyl radicals wherein one or more hydrogen atoms is replaced by a halogen radical, an amido radical, a phosphido radical, and alkoxy radical or any other radical containing a Lewis acidic or basic functionality, $C_1$–$C_{20}$ hydrocarbyl-substituted metalloid radicals wherein the metalloid is selected from the Group 14 of the Periodic Table of Elements; and halogen radicals, amido radicals, phosphido radicals, alkoxy radicals, alkylborido radicals or any other radical containing Lewis acidic or basic functionality; or ($C_5H_{4-x}R_x$) is a cyclopentadienyl ring in which two adjacent R-groups are joined forming $C_4$–$C_{20}$ ring to give a saturated or unsaturated polycyclic cyclopentadienyl ligand such as indenyl, tetrahydroindenyl, fluorenyl or octahydrofluorenyl;

($JR'_{z-2}$) is a heteroatom ligand in which J is an element with a coordination number of three from Group 15 or an element with a coordination number of two from Group 16 of the Periodic Table of Elements, preferably nitrogen, phosphorus, oxygen or sulfur with nitrogen being preferred, and each R' is, independently a radical selected from a group consisting of $C_1$–$C_{20}$ hydrocarbyl radicals, substituted $C_1$–$C_{20}$ hydrocarbyl radicals wherein one or more hydrogen atoms is replaced by a halogen radical, an amido radical, a phosphido radical, an alkoxy radical or any other radical containing a Lewis acidic or basic functionality, and "z" is the coordination number of the element J;

each Q* is, independently, any hydrolyzable anionic ligand such as a hydride, or substituted or unsubstituted $C_1$–$C_{20}$ hydrocarbyl provided that where any Q* is a hydrocarbyl such Q* is different from ($C_5H_{4-x}R_x$), or both Q* together may be an alkylidene or a cyclometallated hydrocarbyl or any other divalent anionic chelating ligand;

T* is a covalent bridging group containing a Group 14 or 15 element such as, but not limited to, a dialkyl, alkylaryl or diaryl silicon or germanium radical, alkyl or aryl phosphine or amine radical, or a hydrocarbyl radical such as methylene, ethylene and the like;

and L is a neutral Lewis base such as diethylether, tetrahydrofuran, dimethylaniline, aniline, trimethylphosphine, n-butylamine, and the like; and "w" is a number from 0 to 3; L can also be a second transition metal compound of the same type such that the two metal centers Z and Z' are bridged by Q* and Q*', wherein Z' has the same meaning as Z and Q*' has the same meaning as Q*. Such compounds are represented by the formula:

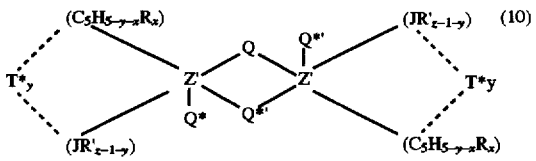

Additional metallocenes are the Group 4 metal amido compounds as described in copending commonly assigned U.S. Ser. No. 922,646, now U.S. Pat. No. 5,318,935 represented by the general formula

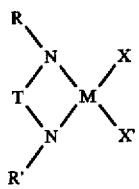

wherein:

"M" is zirconium, hafnium or titanium; "N" is a nitrogen atom having three substituents; "X" and "X'" are any univalent anionic ligand such as a halide, hydride, substituted or unsubstituted $C_1-C_{30}$ hydrocarbyl, alkoxide, aryloxide, amide, arylamide, phosphide or arylphosphide; "T" is a covalent bridging group selected from the group consisting of unsubstituted hydrocarbyls and hydrocarbyls containing a Group IV-A or VI-A element; and each "R" and "R'" is independently a radical selected from the group consisting of singly branched hydrocarbyl radicals having between 4 and 30 carbon atoms, multiply branched hydrocarbyl radicals having between 4 and 30 carbon atoms, halogen radicals, amido radicals, phosphido radicals, silyl radicals, alkoxy radicals, alkylborido radicals, $C_1-C_{30}$ hydrocarbyl-substituted Group IV-A metalloid radicals; and substituted $C_1-C_{30}$ hydrocarbyl radicals wherein one or more hydrogen atoms is replaced by a halogen radical, an amido radical, a phosphido radical, an alkoxy radical or a radical containing a Lewis acidic or basic functionality;

the Group 4 metal metallocenes as described in EPA 277, 004, represented by the formulae:

$$(A-Cp)MX_1X_2 \quad (12)$$

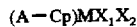
$$(A-Cp)MX'_1X'_2 \quad (13)$$

$$(A-Cp)ML \quad (14)$$

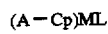
$$(Cp^*)(CpR)MX_1 \quad (15)$$

wherein (A-Cp) is either (Cp)(Cp*) or Cp-A'-Cp* and Cp and Cp* are the same or different substituted or unsubstituted cyclopentadienyl radicals wherein A' is a covalent bridging group containing a Group IV-A element; M is a metal selected from the Group consisting of titanium, zirconium, and hafnium; L is an olefin, diolefin or aryne ligand; $X_1$ and $X_2$ are, independently, selected from the group consisting of hydride radicals, hydrocarbyl radicals having from 1 to about 20 carbon atoms, substituted-hydrocarbyl radicals, wherein one or more of the hydrogen atoms are replaced with a halogen atom, having from 1 to about 20 carbon atoms, organometalloid radicals comprising a Group IV-A element wherein each of the hydrocarbyl substitutions contained in the organic portion of said organometalloid, independently, contain from 1 to about 20 carbon atoms and the like; $X_1$ and $X_2$ are joined and bound to the metal atom to form a metallacycle, in which the metal atom, $X'_1$ and $X'_2$ form a hydrocarbocyclic ring containing from about 3 to about 20 carbon atoms; and R is a substituent, preferably a hydrocarbyl substituent, on one of the cyclopentadienyl radicals which is also bound to the metal atom.

Alternatively, bis(cyclopentadienyl) Group 4 metal compounds may be represented by the formulae:

$$(A-Cp)ZX_1X_2 \quad (16)$$

$$(A-Cp)ZX'_1X'_2 \quad (17)$$

$$(A-Cp)ZJ' \quad (18)$$

$$(Cp^*)(CpR)ZX_1 \quad (19)$$

wherein

"Cp" represents a cyclopentadienyl radical which may be substituted or unsubstituted, and:

(A-Cp) is either (Cp)(Cp*) or Cp-A'-Cp* and Cp and Cp* are the same or different cyclopentadienyl ring substituted with from zero to five substituent groups R, and each substituent group R is, independently, a radical which can be hydrocarbyl, substituted hydrocarbyl, halocarbyl, substituted-halocarbyl, hydrocarbyl-substituted organometalloid, or halogen (the size of the radicals need not be limited to maintain catalytic activity, however, generally the radical will be a $C_1$ to $C_{20}$ radical), or Cp and Cp* are a cyclopentadienyl ring in which two adjacent R groups are joined forming a $C_4$ to $C_{20}$ ring to give a saturated or unsaturated polycyclic cyclopentadienyl ligand such as indenyl, tetrahydroindenyl, fluorenyl, or octahydrofluorenyl and A' is a covalent bridging group which restricts rotation of the two Cp-groups; Z is titanium, zirconium or hafnium; J' is an olefin, diolefin or aryne ligand; $X_1$ and $X_2$ are, independently, selected from the group consisting of hydride radicals, hydrocarbyl radicals having from 1 to about 20 carbon atoms, substituted-hydrocarbyl radicals having from 1 to about 20 carbon atoms, wherein one or more of the hydrogen atoms are replaced with a halogen atom, organometalloid radicals comprising a Group 14 element wherein each of the hydrocarbyl substitutions contained in the organic portion of said organometalloid, independently, contain from 1 to about 20 carbon atoms and the like; $X'_1$ and $X'_2$ are joined and bound to the metal atom to form a metallacycle, in which the metal atom, $X'_1$, and $X'_2$ form a hydrocarbocyclic ring containing from about 3 to about 20 carbon atoms; and R is a substituent, preferably a hydrocarbyl substituent, on one of the cyclopentadienyl radicals which is also bound to the metal atom and the like.

Those transition metal compounds which are activatable to single sited catalyst systems are the most preferred. These include but are not limited to systems comprising (i) two cyclopentadienyl ligands, each optionally substituted and the two optionally being bridged with a bridging atom or group or (ii) a single, optionally substituted, cyclopentadienyl ligand and a heteroatom-containing ligand, the two ligands optionally being bridged with a bridging atom or group.

Generally, any metallocene which has heretofore been activated to a catalytic state by reaction with an alumoxane is also suitable for activation by reaction with a mono or polyanionic activator composition. Illustrative, but not limiting examples of bis(cyclopentadienyl) Group 4 metal compounds which may be used in the preparation of the improved catalyst of this invention are described in EPA 277,003; EPA 277,004, EPA 416,815 and PCT WO 92/00333. All references cited in the metallocene portion of this application are herein incorporated by reference.

Activators or Co-Catalysts:

The metallocene systems described above may be activated to a catalytic state via the conventionally described and known co-catalyst, alumoxane, in accord with the art, and represented by the general formulae:

$$(R^3-Al-O)p \quad (20)$$

$$R^4(R^5-Al-O)p-AlR^6 \quad (21)$$

wherein $R^3$, $R^4$, $R^5$ and $R^6$ are, independently a $C_1-C_{16}$ alkyl or aryl radical, Al is aluminum and O is oxygen;

or ionic activators in accordance with EPA 277003, EPA 277004 each assigned to Exxon Chemical Patents Inc. or alternatively, ionic activators as described by Dow Chemical Company in EPA 468651 or Fina Technology Inc in EPA 426637 all herein incorporated by reference.

Ionic activators or second components in the catalyst system may be utilized as a monoionic version as described in EPA 277004 and represented by the general formula:

[(M')m+Q1 ... Qn]d- (22)

wherein

M' is a metal or metalloid; $Q_1$ to $Q_n$ are, independently, hydride radicals, bridged or unbridged dialkylamido radicals, alkoxide and aryloxide radicals, hydrocarbyl and substituted-hydrocarbyl radicals, halocarbyl and substituted-halocarbyl radicals and hydrocarbyl and halocarbyl-substituted organometalloid radicals and any one, not more than one, of $Q_1$ to $Q_n$ may be a halide radical; m is an integer representing the formal valence charge of M; and n is the total number of ligand q.

Any metal or metalloid capable of forming an anionic complex which is stable in water may be used or contained in the anion of the second compound. Suitable metals, then, include, but are not limited to, aluminum, gold, platinum and the like. Suitable metalloids include, but are not limited to, boron, phosphorus, silicon and the like. Compounds containing anions which comprise coordination complexes containing a single metal or metalloid atom are, of course, well known and many, particularly such compounds containing a single boron atom in the anion portion, are available commercially. In light of this, salts containing anions comprising a coordination complex containing a single boron atom are preferred. Ionic activators may therefore comprise a single boron atom as described in EPA 277004 or a plurality of boron atoms as described in EPA 277003.

Alternatively, ionic activators may be employed in the polyanionic version as described in copending, commonly assigned application, U.S. Ser. No. 796729 wherein a central non-ionic core (T) is present having a plurality of chemically bound pendant non-coordinating anionic groups represented by the formula:

$(Q_1Q_2 ... Q_nM^{m+}D_d)^-$ (23)

wherein

M is a metal or metalloid element;

$Q_1-Q_n$ are radical ligands each of which is, independently, hydride, dialkylamido, alkoxide, aryloxide, hydrocarbyl, substituted hydrocarbyl, halocarbyl, substituted halocarbyl, or hydrocarbyl and halocarbyl-substituted organometalloid, with no more than one of $Q_1-Q_n$ being a halide;

"n" is the number of Q-ligands;

"d" is 0 or 1;

when "d" is 1, D is a diradical bridging group or atom which links a pendent non-coordinating anion to the core T;

"m" is an integer representing the oxidation state of M; and n−m=1;

and stabilized by a cation which provides the composition with a neutral charge.

Preparation of the ionic activators or alumoxane is in accordance with the art cited, all of which is incorporated by reference herein.

A metallocene-alumoxane olefin polymerization catalyst may alternatively be produced as a reaction product in accord with that taught by Turner in U.S. Pat. No. 4,752,597, assigned to Exxon Chemical Patents Inc wherein it is disclosed that a solid reaction product is obtained by reacting at least one metallocene of a metal of Group 4B of the Periodic Table with an alumoxane at a ratio of 1:12 to about 1:100 on a molar basis based on the metal and aluminum.

The catalyst systems described above may optionally be supported in accordance with that taught in U.S. Pat. Nos. 5,057,475, 5,017,714 or commonly assigned, copending applications U.S. Ser. No. 468,382 (filed Oct. 15, 1991) now abandoned, U.S. Ser. No. 885,170 (filed May 18, 1992), now U.S. Pat. No. 5,240,894 or U.S. Ser. No. 926,006 (filed Aug. 5, 19992), now abandoned all incorporated by reference herein.

The catalyst systems may also be used with a scavenging component such as an organoaluminum or alkyl aluminum reagent to increase activity as described in the art. Scavenging components for use with metallocene-alumoxane catalyst systems are well known in the art. Specific teachings directed to bis(cyclopentadienyl) ionic activated systems can be found in U.S. Pat. No. 5,153,157 incorporated by reference herein.

The Reaction Process

The process of the present invention is primarily characterized as being continuous, employs a dilute feed, and is operated to achieve a high conversion of α-olefin and ethylene as defined herein. Within these parameters, the ethylene/α-olefin product is controlled to have a number average molecular weight of not greater than 15,000 using a metallocene catalyst system as described above.

The process is continuous in the sense that monomer feed is continuously introduced into the reaction zone and resultant product continuously withdrawn.

The advantages of employing a dilute monomer feed are described above. The diluent can be any non-reactive (under the conditions employed) material which preferably is: (i) capable of being liquified under reaction conditions; (ii) capable of dissolving at least the α-olefin monomer employed; and (iii) capable of dissolving or at least suspending the polymer product under reaction conditions such that viscosity buildup is sufficiently minimized to the extent that the mass transfer rate of the ethylene needed to homogeneously distribute the ethylene throughout the reaction zone is at least equal to preferably greater than the reaction rate.

More specifically, the mass transfer rate for a given reactant or reactants is expressed in units of moles/liter-seconds and represents the time needed to attain $K_{OBS}$ at a selected concentration of monomer in the reaction zone.

The vapor phase of the reaction mixture includes both small bubbles of vapor contained in the liquid reaction medium and vapor present in the vapor space above the liquid reaction medium.

Hence, even a non-reflux reactor may have a vapor phase—even if such a reactor were filled to the top so as to remove the vapor space entirely.

Accordingly, at any given temperature, the relationship between ethylene in the vapor phase and ethylene in solution may be represented by the equation

$$K_{OBS} = \frac{[Eth]_g}{[Eth]_l}$$

where $[Eth]_g$ is the observed molar concentration of ethylene in the gas phase, $[Eth]_l$ is the observed molar concentration of ethylene in the liquid phase, and $K_{OBS}$ is the resulting observed equilibrium constant.

In the ideal situation where there is zero mass transfer resistance (i.e. high mass transfer), it would be found that $$K_{OBS} = K_{EQ}$$

where $K_{EQ}$ is the constant representing perfect thermodynamic equilibrium between liquid and vapor for a selected monomer at a given temperature and diluent solution, and having no polymer dissolved therein.

However, the polymer product formed by the reaction increases the solution viscosity from the ideal, making ethylene less able to enter the liquid phase (i.e. increasing mass transfer resistance). Ethylene may then easily leave the liquid phase of the feed but is more reluctant to reenter the polymer-containing reaction mixture. Where pure or highly concentrated feeds are used (note that the comonomers are the solvents in a pure feed), as in the prior art, it is found that $$K_{OBS} \gg K_{EQ}$$

In the instant invention, however $$K_{OBS} = K_{EQ}$$

such that the mass transfer rate of ethylene is at least equal to, preferably greater than, the rate at which ethylene is consumed in the polymerization reaction.

Suitable but less preferred diluents include such solvents as alkanes, aromatic hydrocarbons, nonreactive alkenes.

It is contemplated that the non-reactive diluents comprise typically at least 30, preferably at least 40, and most preferably at least 50 weight % of the α-olefin feed stream and the diluent can range typically from about 30 to about 90 preferably from about 40 percent to about 80, and most preferably from about 50 to about 60 weight % of the α-olefin feed stream before admixture with ethylene.

It is a particular advantage of the present invention that the preferred diluents are naturally present in various refinery streams containing α-olefin monomer reactants. Such streams to be useful must contain at least one α-olefin as the reactive constituent. However, these streams typically will contain non-reactive constituents which have a similar carbon number to the α-olefin. The similarity in carbon number causes the non-reactive constituents to have similar boiling points to the α-olefin. Consequently, the non-reactive constituents will vaporize together with the α-olefin and not only dilute the α-olefin in the vapor space, but also the ethylene. As indicated above, this dilution effect decreases the mass transfer resistance of the reactive monomers in the vapor space particularly ethylene.

Accordingly, a preferred diluent will contain components comprising typically at least 50, preferably at least 75, and most preferably at least 95 weight %, and typically from about 50 to about 100, preferably from about 75 to about 100, and most preferably from about 95 to about 100 weight % thereof, having a boiling point at the reaction conditions of typically within about ±20°, preferably within about ±15°, and most preferably within about ±10° C. of the average boiling point of the α-olefin constituents of the feed.

Representative of such refinery streams are those which contain butene-1, propylene or $C_5$ α-olefin. Preferred butene-1 containing streams are referred to herein as Raffinate-2 Streams. Such streams typically have had isobutylene content significantly lowered in relation to the stream from which they are derived.

Raffinate-2 is typically derived from either butane/butene catalytic cracking refinery streams (BB-streams) or Raffinate-1 which, in turn, is derived from butadiene crude produced by steam cracking plants.

Butadiene crudes and the resultant raffinates vary widely in composition, but a random sampling may be as follows:

| CRUDE BUTADIENE | |
|---|---|
| | Range (% by weight) |
| BUTADIENE | 43.5 ± 20 |
| ISOBUTYLENE | 25.2 ± 10 |
| BUTENE-1 | 15.5 ± 8 |
| CIS-BUTENE-2 | 2.0 ± 1 |
| TRANS-BUTENE-2 | 6.2 ± 3 |
| N-BUTANE | 4.6 ± 2 |
| ISOBUTANE | 2.9 ± 1.5 |
| *OTHER | 0.1 ± .05 |

*Other includes propane, propene, pentanes, pentenes, and water in addition to trace quantities of other hydrocarbons.

Butadiene crude is valued for its butadiene. After solvent extraction of the butadiene, one is left with Raffinate-1. A representative example of a typical Raffinate-1 derived from the above crude butadiene stream is as follows:

| RAFFINATE-1 | |
|---|---|
| | Range (% by weight) |
| BUTADIENE | 0.1 ± .05 |
| ISOBUTYLENE | 44.6 ± 20 |
| BUTENE-1 | 27.4 ± 15 |
| CIS-BUTENE-2 | 3.5 ± 1.5 |
| TRANS-BUTENE-2 | 10.9 ± 5 |
| N-BUTANE | 8.1 ± 4 |
| ISOBUTANE | 5.2 ± 2.5 |
| OTHER | 0.2 ± .1 |

A representative example of a butane/butene (BB) stream derived from refinery fluid catalytic cracking is as follows:

| BB-STREAM | |
|---|---|
| | Range (% by weight) |
| BUTADIENE | 0.3 ± .15 |
| ISOBUTYLENE | 12.6 ± 6 |
| BUTENE-1 | 13.6 ± 6 |
| CIS-BUTENE-2 | 9.0 ± 4 |
| TRANS-BUTENE-2 | 13.8 ± 6 |
| N-BUTANE | 10.5 ± 5 |
| ISOBUTANE | 36.7 ± 15 |
| OTHER | 3.5 ± 1.5 |

Raffinate-1 and BB-streams are highly prized for their isobutylene content which is used for the production of polyisobutylene (PIB) and methyl-tert-butyl ether (MTBE). As can be seen, the composition of Raffinate-2 will vary dramatically, depending upon the source;

| | Possible Raffinate-2 From Crude (weight %) | Possible Raffinate-2 From BB-Stream (weight %) |
|---|---|---|
| BUTADIENE | 0–5 | 0.4 ± .2 |
| ISOBUTYLENE | 0–5 | 0.2 ± .1 |
| BUTENE-1 | 49.5 ± 25 | 15.4 ± 7 |
| CIS-BUTENE-2 | 6.4 ± 3 | 10.2 ± 5 |
| TRANS-BUTENE-2 | 19.6 ± 10 | 15.6 ± 7 |
| N-BUTANE | 14.7 ± 7 | 12.0 ± 6 |
| ISOBUTANE | 9.4 ± 4 | 42.1 ± 20 |
| *OTHER | 0.2 ± .1 | 4.1 ± 2 |

*Other in the Raffinate-2 derived from MTBE production will include traces of MTBE, methanol, di-methyl ether, and tert-butyl alcohol.

Typical commercially available butene-1 concentrations in Raffinate-2 range from about 15 to about 55 weight %.

The above butene-1 containing refinery streams are preferred for making ethylene/butene-1 copolymer (EB-1) which has been found to be highly effective as a backbone for the production of lubricants, oil dispersants, and viscosity modifiers.

Note, however, that the instant invention may also make use of B/B streams and Raffinate-1 directly, since metallocene catalyst systems are almost entirely unreactive toward isobutylene. Hence, depending upon shipping costs, convenience, or whatever other factors may affect the decision-making process, the practitioner has the option of either acquiring Raffinate-2 and running it through the process of the instant invention or first acquiring either Raffinate-1 or a B/B stream, running it through the process, and then shipping the resultant isobutylene-enriched stream on to an MTBE plant or other end use. The use of Raffinate-2 is likely the more preferred.

The use of crude butadiene streams directly is not desired since it would waste butadiene during hydrogenation.

The above discussion is not intended to require the use of refinery streams and in fact it is contemplated that dilute α-olefin containing streams can be prepared by separately combining pure α-olefin and one or more pure diluents, e.g. pure isobutane, such as those typically found in the above refinery streams.

It will also be seen that this invention is useful in the production of virtually any ethylene/α-olefin copolymer and may therefore be used in the processing of other dilute refinery streams, such as dilute propene and pentene streams common in the industry.

Dilute refinery propene streams, known in the industry as "C3 streams" are also derived from steam and catalytic cracking and generally comprise the following components:

| Representative $C_3$ Streams | |
|---|---|
| | Range (weight %) |
| PROPYLENE | 55 ± 20 |
| PROPANE | 34 ± 15 |
| ETHYLENE | 2 ± 1 |
| ETHANE | 8 ± 4 |
| *OTHER | 1 ± .5 |

*Other includes methane, acetylenes, propadiene trace C4's and C5's, and trace polar compounds such as water, carbonyl sulfide, methyl mercaptan, and hydrogen sulfide.

Dilute refinery pentene streams, known in the industry as "C5 streams" are produced by steam and catalytic cracking as well. Their composition is quite a bit more complex than that of C3 and C4 streams:

| Representative $C_5$ Streams | |
|---|---|
| | Range (weight %) |
| 2-METHYL-BUTENE-1 | 9.0 ± 4 |
| 3-METHYL-BUTENE-1 | 1.6 ± 1 |
| PENTENE-1 | 5.1 ± 2 |
| 2-METHYL-BUTENE-2 | 14.9 ± 7 |
| PENTENE-2 | 15.4 ± 7 |
| ISOPRENE | 0.7 ± .3 |
| ISOPENTANE | 36.2 ± 15 |
| n-PENTANE | 5.5 ± 2 |
| CYCLOPENTANE | 0.6 ± .3 |
| CYCLOPENTENE | 1.5 ± .75 |
| PIPERYLENE | 0.9 ± .4 |
| C6 OLEFINS | 1.5 ± .75 |
| C6 ALKYLS | 3.5 ± 1.5 |

-continued

| Representative $C_5$ Streams | |
|---|---|
| | Range (weight %) |
| C7s AND C8s | 2.0 ± 1 |
| *OTHERS | 1.6 ± 1 |

*Others include benzene and polar compounds.

Pentene-1 and cyclopentene are the most reactive components of a C5 stream in the presence of a metallocene catalyst system. The two are easily separated from each other by distillation and are easily concentrated.

Whether a constituent, e.g. of the refinery stream, qualifies as a diluent under reaction conditions depends on whether it is non-reactive which in turn can depend on the type of pretreatment the feed is subjected to.

By "non-reactive" when used in conjunction with diluent is meant that less than 5, preferably less than 3, and most preferably less than 1 weight percent of constituent present in the feed is incorporated into the polymer product and the constituent does not totally deactivate the metallocene catalyst system.

Typically any saturated hydrocarbon constituent will qualify as diluent as well as highly unreactive unsaturated constituents such as butene-2 and isobutylene.

Materials such as butadiene tend to deactivate the catalyst. Hence, it is preferred that they be removed or at least partially saturated by hydrogenation. Once saturated, the butadiene becomes part of the diluent as butane, butene-2, or reactive butene-1.

As indicated above, the process of the invention is controlled to achieve high ethylene and α-olefin conversion. Conversion is directly proportional to monomer concentration, catalyst concentration and residence time.

Accordingly, the above parameters are controlled to achieve an ethylene conversion of typically at least about 70%, preferably at least about 80%, and most preferably at least about 90% and can range typically from about 70% to about 100%, preferably from about 80% to about 100% and most preferably from about 90% to about 100% (e.g. 90–95) %. The α-olefin conversion is controlled to be typically at least about 30%, e.g., at least 40%, preferably at least about 50%, and most preferably at least about 60% and can range typically from about 30% to about 95%, preferably from about 40% to about 90% and most preferably from about 50% to about 90%.

Monomer conversion can be determined by the following equation:

$$\% \text{ Conversion} = \frac{\text{wt/hr of monomer incorporated into polymer}}{\text{wt/hr of monomer in feed}} \times 100$$

or by the equation $$\% \text{ Conversion} = \frac{\text{wt/hr monomer in feed} - \text{wt/hr monomer not reacted}}{\text{wt/hr monomer in feed}} \times 100$$

The particular α-olefin conversion employed depends in part on the ethylene content sought to be imparted to the polymer and hence on the ethylene concentration in the mixed feed. For example, at low ethylene content the α-olefin conversion typically will be lower than for high ethylene content feeds.

While high conversion can be achieved by any combination of process conditions affecting conversion it is preferred to maintain a low catalyst concentration and low monomer concentration and attain high conversion with a long residence time.

However, preferably the ethylene conversion is controlled in a manner such that the ratio of the weight % of ethylene in the vapor phase to the weight % of ethylene in the reactant feed stream is typically not greater than about 1.2:1, preferably less than 1:1 and most preferably from about 0.1:1 to about 0.7:1 (e.g. 0.1:1 to 0.5:1).

The catalyst concentration is typically held just above the poison level due to cost of the catalyst. Preferably the feed is treated to remove most if not all catalyst poisons. Minor poison contamination can be accommodated by increasing the catalyst system concentration with the excess used to remove the poison by reaction therewith.

The monomer in the reaction mixture is kept low through the use of the diluent in the feed and operating at high conversions.

Accordingly, while any effective catalyst concentration can be employed it is contemplated that such effective amounts will be sufficient to achieve a weight ratio of metallocene catalyst system to polymer product of typically from about $1\times10^{-4}:1$ to about $7\times10^{-4}:1$.

The residence time is determined from the equation:

$$\text{Res. time} = \frac{\text{tot. true vol. of liq. in reactor}}{\text{tot vol./time of liq. exiting reactor}}$$

wherein gas bubble vol. in the liquid is subtracted from apparent vol of liquid in reactor to obtain true volume.

Accordingly, typical residence times can vary typically from about 0.1 to about 5 hrs., preferably from about 0.5 to about 4 hrs., and more preferably from about 1 to about 3 hrs.

Reaction temperature and pressure are preferably controlled to liquify the diluent and α-olefin. However, the reaction temperature is typically selected to be above the critical temperature of ethylene but below the critical temperature of the α-olefin feed and/or diluent.

Accordingly, while any effective temperature can be employed it is contemplated that such effective temperatures for a feed containing butene-1 will range typically from about 30° to about 150° C., preferably from about 50° to about 120° C., and most preferably from about 60° to about 110° C.

For the dilute refinery streams of propylene having propane as the major diluent, the critical temperature of propylene and propane are 92.42° C. (198.36° F.) and 96.7° C. (206.06° F.) respectively, so the typical range of reaction temperatures would be 30° to 96°, and preferably from about 60° to 92° C.

The critical temperature of the feed components in the reactor places an upper limit on temperature when using a boiling reactor since the reflux mechanism becomes useless if nearly all or all of the feed flashes into the reactor vessel and there remains no liquid phase to reflux. In less preferred embodiments the operation above the critical temperature of the major reactor constituents must be compensated for by assisting or eliminating the reflux mechanism altogether and relying on alternative cooling means, such as jacket cooling or internal cooling coils. Neither of these solutions is as effective nor as efficient as reflux cooling in maintaining homogeneity of temperature throughout the reaction solution.

More specifically, the molecular weight distribution (Mw/Mn) of the polymer is broadened by variations of: temperature, monomer concentration, and catalyst concentration.

As indicated above, the boiling reactor represents the preferred method for temperature control. Variations on the boiling reactor configuration include internal reflux, e.g. using cooling coils inserted into the vapor space or an external system wherein vapor is removed from the vapor space and introduced to an external reflux apparatus, the vapor condensed and the condensate returned to the reactor and/or feed.

Alternative non-reflux temperature control means include pumparound cooling where liquid is removed from the reactor, cooled, and then returned to the reactor. Pumparound cooling offers the added advantage of being able to return cooled liquid to the reactor using high pressure pumps to also provide mixing of reactor contents with high speed jets.

Reactor pressures are typically controlled to maintain the diluent and α-olefin in liquid form at the selected temperature. In boiling reactors the pressure is selected to obtain boiling of the diluent/α-olefin reactor constituents at the reaction temperature.

Accordingly while any effective pressure can be employed it is contemplated that such effective pressures for butene-1 feeds will range typically from about 2.4 to about 39 ATM, preferably from about 4.4 to about 28 ATM, and most preferably from about 5.6 to about 23.5 ATM.

The reaction mixture is preferably vigorously mixed by any suitable means such as impeller, jet pump, or vigorous boiling or combinations thereof. Baffles and strategic placement of feed input can be employed to further facilitate mixing.

The Integrated Process

Referring now to FIG. 1, there is depicted a schematic diagram of the overall process scheme. A dilute propylene, butene, or pentene refinery feed is piped to a diene removal system 50. It is desirable to remove or saturate any dienes that may contaminate the feed since dienes tend to either poison metallocene catalyst systems, crosslink polymer chains, or both. Alkynes are also poisonous and must be removed or saturated. However, this step in the process is an option since dilute refinery streams vary widely in composition and, therefore, may have virtually no diene contamination or, in fact, none at all.

The next step in the process is to carry the refinery stream to a concentration system 51 where more volatile ("lights") and less volatile ("heavies") components as well as catalyst-poisoning polar compounds, such as water, sulfides, alcohols, and nitrogen, sulfer, and oxygen derivatives in general may be removed so as to bring the weight percent of the olefin monomer in relation to the nonreactive diluents to within the range desired. In cases where it is desired to recycle unreacted olefin monomer and/or to further dilute a refinery feed having excess concentration of olefin monomer, a recycle stream 52 may be combined with the input stream 53. The source of this recycle stream will be discussed below in connection with the diluent removal system 65.

After adjusting the concentration and removing polar poisons, it is preferable to pass the feed through a scavenger bed system 54 that removes any remaining catalyst poisons and filters out any particulates. The pre-treated dilute refinery feed emanating therefrom is piped to the preferred boiling reactor system 55 depicted in more detail FIG. 2 and co-polymerized with ethylene.

Figure 2:
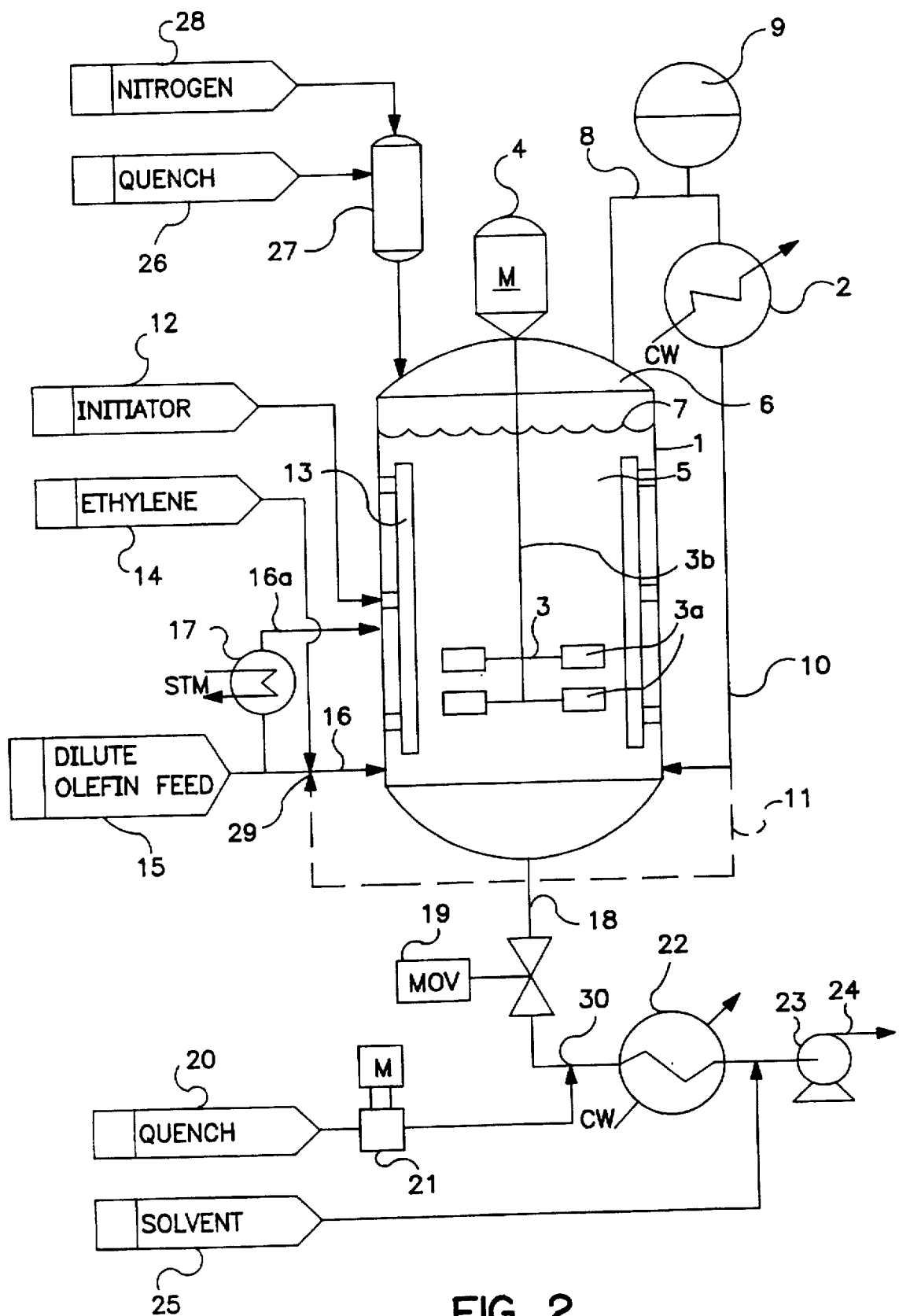
FIG. 2 is a schematic view of the reflux boiling reactor system.

More specifically, referring to FIG. 2, there is provided a reactor vessel 1 having an external reflux condenser 2 in fluid communication therewith via gas space 6, conduit 8, and condensate return conduit 10.

Analyzer means 9 monitors the concentrations of unreacted gaseous reactants flowing from the gas space to condenser 2 through line 8. Within the reactor vessel 1, there is provided an agitator 3 having one or more blades 3a and driven via a rotating shaft 3b affixed to a motor 4.

During the continuous reaction, there will exist a gas space 6 over a liquid reaction phase 5 within the reactor vessel 1. The gas/liquid interface 7 is depicted by a wavy line.

Baffles 13 are provided to increase turbulent mixing and eliminate vortexing of the liquid phase by creating axial mixing patterns. The metallocene catalyst system is fed into the reactor through line 12. Ethylene in liquid, vapor, or liquid/vapor form is fed through line 14 and liquified dilute α-olefin is fed through line 15. The olefin feeds are mixed at a juncture 29 prior to injection into the reactor vessel through line 16. The purpose being to dissolve the pure ethylene feed into the diluent prior to contact with the catalyst so as to prevent the ethylene from unduly reacting with itself rather than the α-olefin. For the same reasons, a pre-cooler (not shown) may be employed at this point to aid in dissolving gaseous ethylene in the diluent. Note that pre-dissolving may be further enhanced by running the reflux line 10 to the juncture 29 via an extension 11 rather than injecting the reflux directly into the reactor vessel. As stated above, a unique aspect of the process of this invention is that the reflux is usually more dilute, and higher in olefin monomer concentration relative to ethylene concentration, than in the feed.

For start-up, a heat exchanger 17 may be employed to bring the reaction mixture up to operating temperature by injecting a heated dilute/α-olefin feed through line 16a. When the reactor fills and comes to the desired operating temperature the catalyst and admixed feeds are injected.

Also provided is an emergency quench vessel 27, filled via a quench feed 26 and pressurized by an inert gas line 28, which may rapidly inject its contents into the reactor in the event of a runaway reaction.

The products dissolved in diluent, as well as unreacted reactants and initiator, exit through line 18 past a isolation valve 19 and are quenched by a quench feed 20 driven by a pump 21. Since the pressure in line 30 is generally lower than in the reactor, a cooling heat-exchanger 22 is employed to recondense any diluent that may have flashed. Gases in the reactor output would reduce the efficiency of the centrifugal pump 23 that drives the product stream line 24. Also, lowering the temperature of the product stream to produce a single liquid phase is desirable when mixing with a quench solution.

For especially viscous products, such as those with high ethylene content and/or large molecular weights, it may be desirable to add solvent via a solvent feed 25 to the product stream.

Returning to FIG. 1, also entering the reactor system 55 would be the metallocene catalyst complex which, if not shipped to the process plant premixed, would be mixed on site in a catalyst mixing system 56.

After quenching, the quenched polymer solution is passed through a deashing system 59 where metallic components from the spent catalyst and possibly the quench solution are removed. Note that if a supported catalyst system is used, the quenching and deashing steps would be replaced with a catalyst removal, reactivation, and recycle system. Regardless, a solution of diluent, unreacted reactants, and polymer emanates and must be purified.

The mixture of diluents, polymer product, and unreacted reactants is now carried to a diluent removal process 65 wherefrom preferably three streams emanate: the first, nearly pure polymer product 60; the second, unreacted olefin monomer dissolved in diluent 62, preferably more dilute than the refinery feed entering the concentration system 53 for the situations where the dilute refinery feed entering the concentration system is already more concentrated in olefin monomer than desired; and a third 64 composed of "superlights" such as trace unreacted ethylene, methanes, nitrogen, and the like.

The second stream 62 may be used to dilute excessively viscous polymer solution emanating from the reactor system 55 as described above. Where this is not necessary, this stream may be diverted as an unreacted olefin monomer recycle 52 or otherwise disposed of, 63.

In cases where olefin monomer conversion is so high that recycling is unnecessary, the unreacted olefin monomers may be diverted for other uses, such as to a refinery for processing.

Since virtually all of the ethylene is reacted, the third gaseous stream 64 containing only trace amounts of this material and other "lights" may be used as fuel gas or sent to a flare, absent some other use.

The nearly pure polymer product at this point will nevertheless contain traces of diluent and unreacted olefin dissolved within it as well as small amounts of extremely low molecular weight "light" polymers. Also, trace quantities of water will be present where the quench was in aqueous solution. Hence, the product stream is sent to a stripping process 66 via Line 60 which eliminates the last of the water, reactants, and solvents. Preferably, the "light" polymers are sent via Line 67 to the refinery pipestills to be reintroduced into the cracker and the now nearly pure polymer product emerges 68 to be piped to a holding vessel.

The Preferred Embodiment

Figure 3:
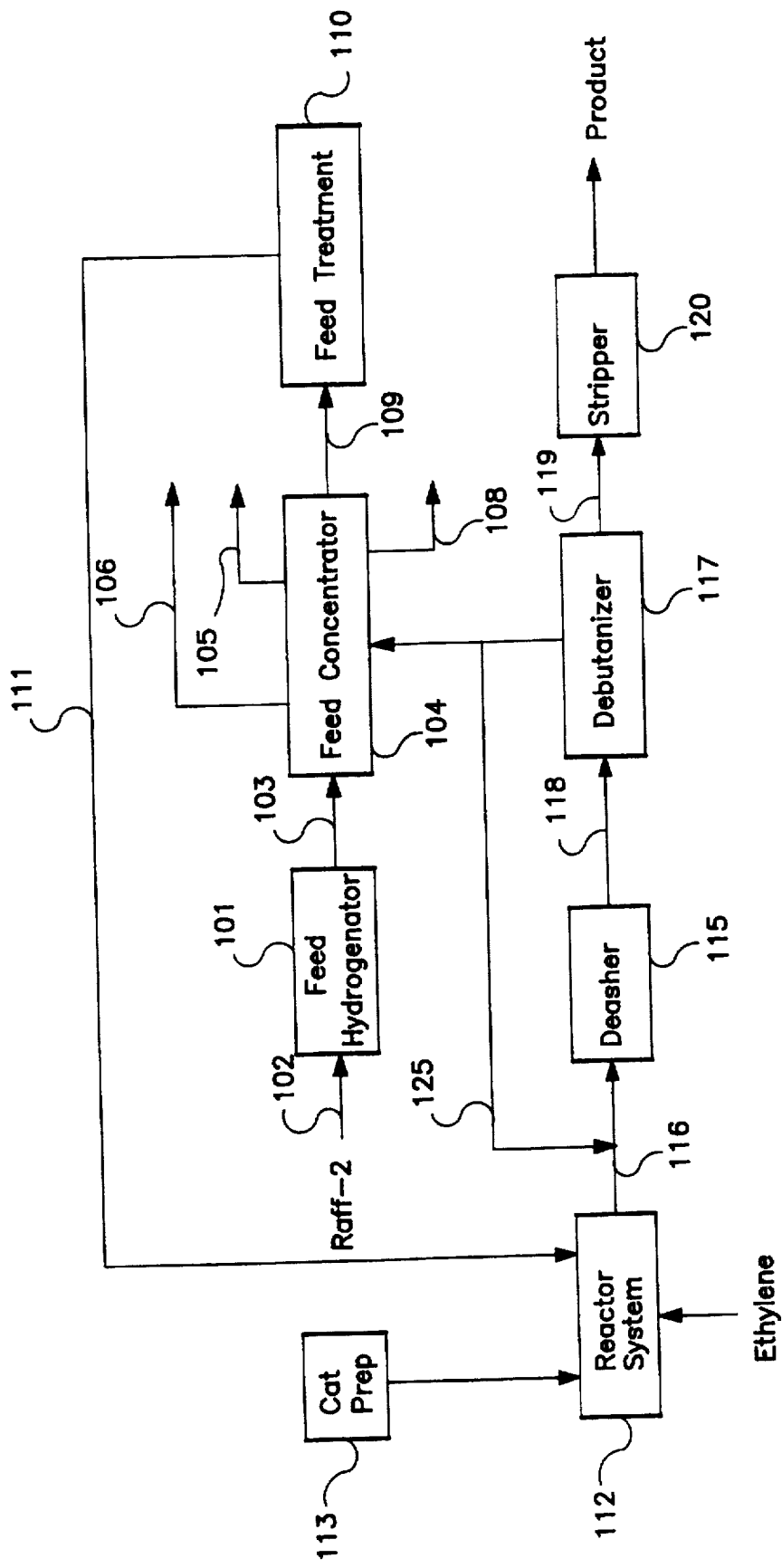
FIG. 3 is a schematic view of a preferred dilute feed polymer production process.

Referring now to FIG. 3, there is seen a preferred embodiment of the process of FIG. 1, here shown for the specific case of a Raffinate-2 feed. The overall industrial process may be broken down into eight subsystems—a Feed Hydrogenation System, a Feed Concentration System, a Feed Treater, a Reactor System, a Catalyst Preparation System, a Deashing System, a Debutanizer, and a Stripper System.

The dilute α-olefin stream, referred to herein as Raffinate-2, enters the Feed Hydrogenation System 101 through an input line 102 and is immediately passed through one or more coalescing units. The coalescing units cause emulsified water to coalesce into large water droplets. The stream is then heated to about 55° C. and pressurized with hydrogen at about 17 atmospheres from a hydrogen feed in the presence of a catalyst inside one or more hydrogenation vessels. The result is that the 1,3 butadienes in the raw feed are reduced to n-butane and butene-2. Of course, some of the valuable butene-1 is also lost, but since the dienes only make up less than 1 percent of the raw feed and are so much more reactive than butene-1, only a fraction of 1 percent of the butene-1 is lost. Should the hydrogenation prove excessive, a carbon monoxide input may be provided to lower the activity of the catalyst in the vessels. Analyzers measure the input and output concentrations of butadiene and regulate the $H_2/CO$ mixture. The treated raw feed is passed through a particulate filter and exits the Feed Hydrogenation System via Line 103.

The hydrogenated feed from the Hydrogenation System is fed into the Feed Concentration System 104 through line 103 and introduced into a first fractional distillation tower wherein the fractionation process removes the "light" materials (i.e., the materials more volatile than the C4's). During this process, a water trap or "boot" on a distillate drum removes any water from the hydrogenated feed. Gaseous lights such as methane, ethylene, ethane, propylene, propane, and insignificant amounts of hydrogen, carbon monoxide, isobutane, isobutylene and butene-1 are vented via Line 105. Some water vapor will also exit this route.

Liquid isobutane having methane, C2's, and C3's dissolved therein along with small amounts of the C4's and methanol, di-methyl ether, and trace water is recovered via Line 106.

The effluent from the bottom of the first distillation tower will have virtually no detectable amounts of organic materials having less than 4 carbon atoms. This stream is introduced into a second distillation tower which removes the "heavy" components, e.g. primarily cis and trans butene-2, small amounts of the other C4's, and virtually all of the pentanes, pentenes, MTBE, and tert-butyl alcohol which are removed via Line 108.

The parameters of the concentration system are adjusted to the composition of the hydrogenated feed; hence, analyzers are preferred on the input and reflux lines of the fractional distillers to monitor the C4 compositions. The output of the Concentration System is preferably nearly 100 percent C4's, 30 percent to 50 percent comprising butene-1, and is fed via Line 109 through one or more treatment vessels in the Feed Treater 110 and exits via Line 111 to the Reactor System 112. The purpose of the feed treater is to guard against the possibility of unexpected or unknown contaminants in the material stream that could conceivably make it through the Feed Concentration System.

The Reactor System 112 is as described with regard to FIG. 2.

The metallocene catalyst system is supplied to the reactor system 112 from Catalyst System 113. In the catalyst system, metallocene catalyst component is fed into a mixing vessel. Cocatalyst (activator) stored in one or more cocatalyst vessels is fed into the same mixing vessel by the force of a pressurized nitrogen line. The $N_2$ gas is first passed through a drying vessel since water vapor will inactivate the preferred catalyst mixture of metallocene and MAO as well as many other catalysts. The nitrogen also pressurizes the mixture and provides an inert gas layer above the fluid level therein. The catalyst and cocatalyst mixture are mixed in the mixing vessel and the resulting catalyst mixture continuously fed into the Reactor System 112 by pump via Line 114.

After copolymer leaves Reaction System 112, it enters the Deashing System 115 via Line 116. Line 116 receives a quench feed into Line 116, the quench comprising (for metallocene/MAO catalyst mixtures) aqueous base, such as NaOH(aq). Base destroys the catalyst and cocatalyst and renders the metals (ash) water-soluble.

Upon entering the Deashing System 115, the quenched polymer mix flows through a first baffled orifice mixer. This creates turbulence in the fluid flow and causes the ash to dissolve in the water. This mix then enters a first settling vessel, wherein the aqueous component settles to the bottom and the polymer and solvents float thereon. The aqueous portion flows down to a disengaging drum, but about 95 percent of this flow is diverted for recirculation to the settling vessel.

The hydrophobic phase flows out the top of the first settling vessel, is mixed with pure water (steam condensate is a very convenient source of distilled water in a refinery) and passes through a second set of orifice mixers on its way to a second settling vessel. Again, about 95 percent of the aqueous phase emanating from the bottom of this vessel is diverted for recirculation to the 2nd settling vessel, while the remainder joins the flow for recirculation to the first settling vessel.

Residual ash-containing aqueous effluent from the disengaging drum is shipped off to a wastewater treatment facility.

The deashed polymer solvent mixture then exits the second vessel and enters the Debutanizer 117 via Line 118.

The polymer/solvent stream entering the Debutanizer is heated to about 150° C. by a heat exchanger and then injected into a debutanization tower. Here, unreacted butenes and C4 solvents vaporize upward (as well as trace amounts of very light low MW polymers) while the polymer product flows out the bottom. The polymer flowing out the bottom of the debutanization tower still has substantial amounts of C4's mixed with it—about 3 to 5 percent by weight. Therefore, the bottom product flow is passed through one or more heat exchangers so as to drive the temperature up to about 230° C. This flow is flashed into a flash drum and the hot C4's and light polymer are returned to the debutanizer. The nearly purified polymer product flows to the Stripper System 120 via line 119.

The C4's vaporizing out the top of the debutanizer are fed to a condenser. Uncondensed gases are vented. The condensate flows into a reflux drum having a water trap to catch residual $H_2O$ from the deashing process. The condensate can be fed back into the debutanizer, or diverted to the Feed Concentration System for recycle and/or to the reactor outlet via line 125 for further dilution of viscous product such as high MW polymer with high ethylene content.

The nearly pure product enters a stripper tower 120 via Line 119. The last of the C4's and catalyst solvents are vaporized away and recondensed in a condenser system. Gases are vented, while liquid hydrocarbons are returned to the refinery.

The polymer is drawn out the bottom of the stripper by a pump, passed through a final particulate filter, and tranferred to whatever storage vessel or additional process system awaits it.

Figure 4:
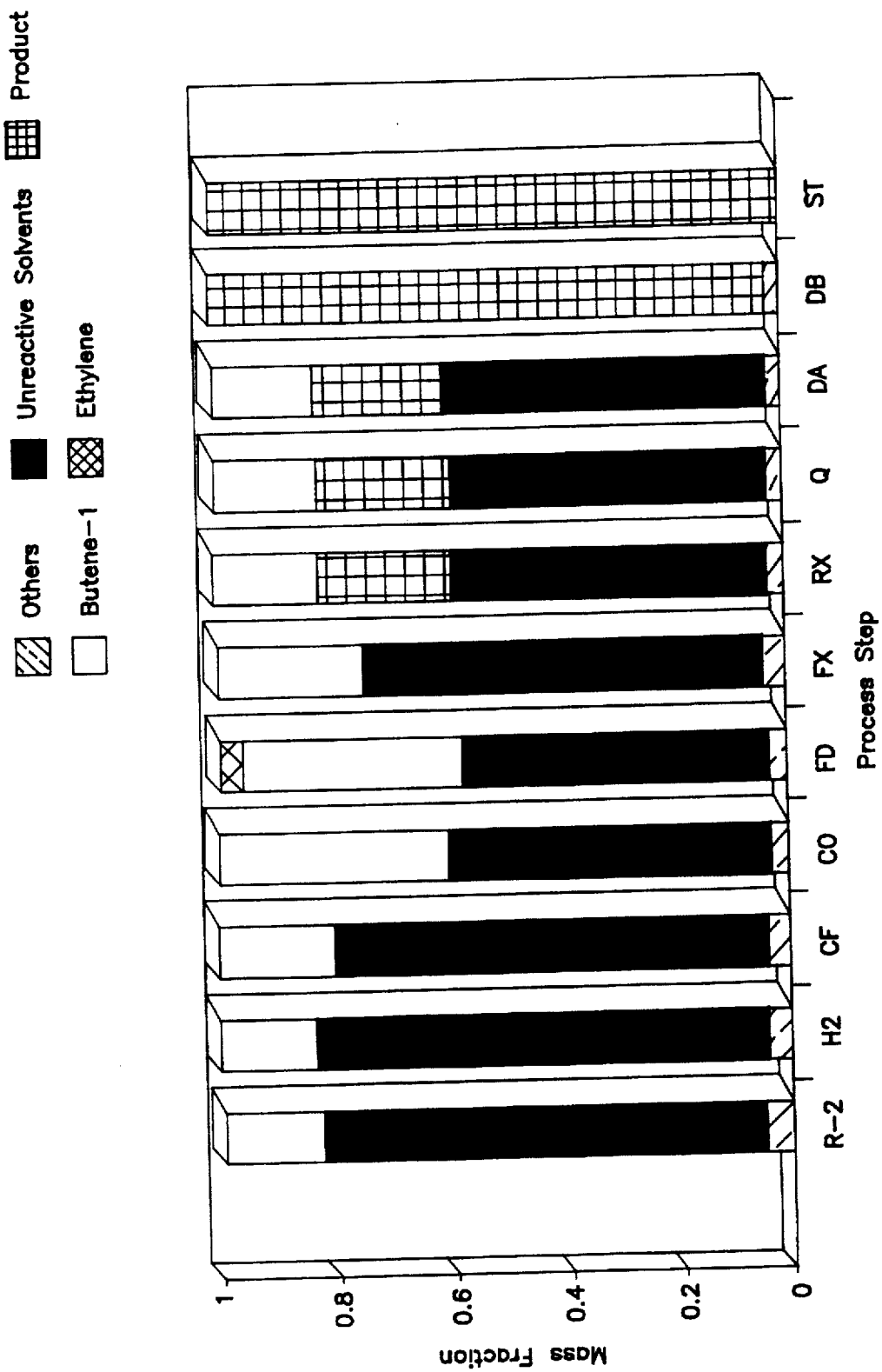
FIG. 4 is a graphic representation of the mass flows of the process of FIG. 3.

Referring to FIG. 4, it can be seen how the relative masses of reactants and diluents would compare for the production of EB-1 polymer having an ethylene content of 20 percent by weight. The first column, labeled R-2, shows the composition of a hypothetical Raffinate-2 comprising about 17 percent by weight of butene-1, 79 percent unreactive isobutane, n-butane, and 2-butenes, and 4 percent of other components including dienes, C3's and C5's. After passing through the hydrogenator, the stream would appear as in column H2—essentially unchanged since the dienes in the raw Raffinate-2 comprise a small and usually fractional percentage of the whole. The feed entering the concentration system when combined with recycle from the debutanizer would appear as in column CF. For a butene-1 conversion of 50 percent, recycling is economical. The recycle in this example shows the butene-1 content to increase from 17 wt % to 20 wt % in the CF stage. The increase only seems small because the graph depicts relative, rather than absolute, amounts. In fact, at a conversion of 50%, the amount of butene-1 at the CF stage is doubled by the recycle.

The effluent from the feed concentrator is shown in column CO wherein the butene-1 fraction is within the desired range at 40 wt percent.

After mixing with ethylene, the combined feed before entering the reactor is shown in column FD. Here, the feed is about 5 percent ethylene by weight and 38 percent butene-1. The composition of the vapor space, and hence the reflux, is shown in column FX. As can be seen, very little ethylene appears in the reflux.

Column RX depicts effluent from the reactor assuming a 50 percent butene-1 conversion. About 45 wt percent of the mass is polymer product. Since the product is low in ethylene content, it is anticipated that the product will not be further diluted. Hence, after a quench of aqueous base, as shown in column Q, the relative masses are virtually unchanged with water comprising about one tenth of one percent of the total mass.

At such low water concentration, the effluent from the deashing process is virtually identical to that after the quench in terms of relative weights as shown in column DA.

However, it can be seen in column DB that, after the product stream flows through the debutanizer, the product comprises about 98 percent of the flow with the bulk of the remainder consisting of light polymers of less than about 500 molecular weight.

The effect of the stripping tower is seen in column ST, wherein the final product is pure.

Figure 5:
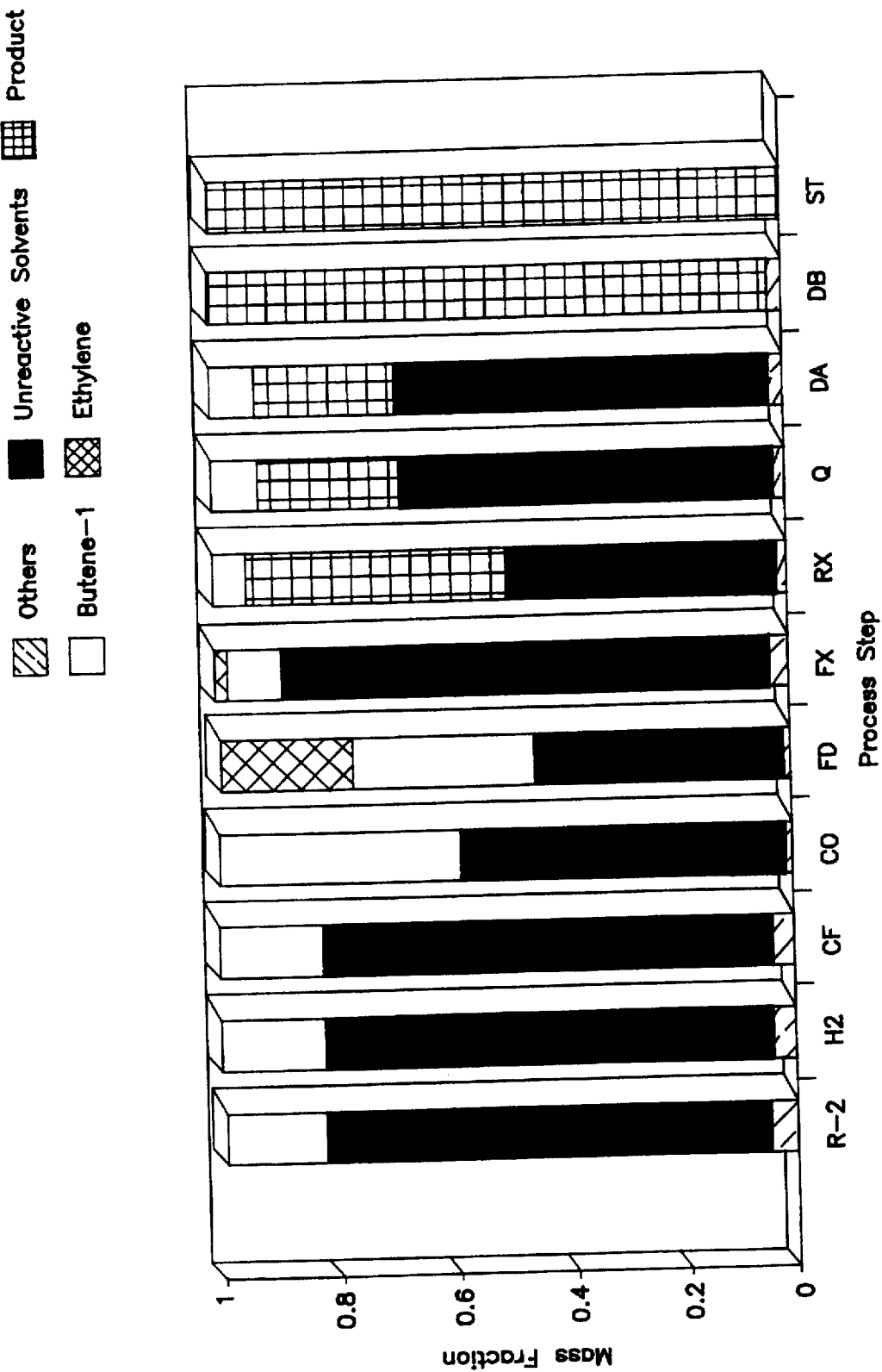
FIG. 5 is a graphic representation of the mass flows of a variation on the process of FIG. 3.

FIG. 5 shows the relative masses of the production flow for the case where the product is 45 percent ethylene by weight and the butene-1 conversion is expected to be 80 percent. This process differs from that in FIG. 4 in that recycling is not employed so column H2 and CF are identical.

Also, because of the high ethylene content of the product and attendant higher viscosity, solvents from the debutanizer will be recycled back to the reactor effluent to dilute the flow, as shown in column Q.

EXAMPLES

In a 200 gallon reflux reactor several runs were conducted, involving copolymerizations of butene-1 and ethylene in accordance with the procedures described in connection with FIG. 2.

Dilute α-olefin feeds were prepared by mixing butene-1 with isobutane. The weight % of butene-1 in this mixture for each run is reported at Column 20 of Table 1. Ethylene gas was then pumped into this mixture. The weight % of ethylene based on the weight of butene-1 and ethylene in the feed is reported at Column 19. The dissolved reactants were passed through a precooler and injected into an evaporatively cooled reaction vessel equipped with external reflux. Isobutane was also injected as an agitator flush through the lower bearing of the agitator shaft. The 200 gallon vessel was equipped with a three-turbine agitator having two upper 12 inch diameter axial turbines having blades that forced the reaction solution downward and a bottom-most 12 inch diameter radial turbine having blades that forced the solution outward and upward.

The catalyst system employed a metallocene component of dimethyl silanyl bis(tetrahydroindenyl) zirconium dichloride and an activator of methyl aluminoxane characterized as having a molecular weight of 1,000, and an aluminum content of 5.93 mole %.

For all the examples, the methylaluminoxane (MAO) is provided as a 10 wt % solution thereof in toluene to which is added the metallocene component to give a final mixture containing 89.87 wt % toluene, 0.15 wt % metallocene component, and 9.98 wt % MAO. When fed to the reaction mixture it provides a mole ratio of Aluminum:Zirconium of about 500:1.

The catalyst mixture was further diluted with isobutane and entered the reactor vessel through an input separate from that of the reactants.

The results of each run and the physical process and product parameters are reported in Table 1, the left most column indicating the Run number.

Since the isobutane and butene-1 were pressurized into the reactor with $N_2$, noncondensable nitrogen gas appeared in the recycle. This was recycled into the reactor since reactants were dissolved in the $N_2$ gas. In actual industrial use, the $N_2$ would either be disengaged from the feed or pumps used rather than gas compression.

The data reported in Table 1 for each Column Number is as follows:

Column 1 indicates a descriptive term for each run. "Low C2=EB" indicates runs conducted with butene-1 exceeding ethylene in the feed by a factor of about 8 by weight (4 by mole), "Mid C2=EB" indicates a ratio of 3 by weight (1.5 by mole), and "Hi C2=EB" a ratio of less than 2 by weight (less than 1 by mole, so ethylene molecules outnumber butene-1 molecules).

Column 2 shows the number average molecular weight of the polymer product as determined by gel permeation chromotography (GPC).

Column 3 shows the molecular weight distribution of the polymer product also determined by GPC.

Column 4 shows the percent ethylene content of the product by weight as determined by fourier transform infrared spectroscopy (FTIR). All the examples are listed in order of increasing percent ethylene content by weight.

Columns 5 through 8 indicate the percent by number of vinylidene, trisubstituted, disubstituted, and vinyl terminal unsaturated polymer chains respectively as determined by HNMR spectroscopy.

Column 9 shows the feed rate of the metallocene catalyst system in cubic centimeters per minute prior to further mixing with the amount of isobutane in column 14.

Columns 10 through 12 show the feed rates of ethylene, butene-1, and isobutane in pounds per hour respectively.

Column 13 shows the amount of isobutane diverted from the amount in column 12 in pounds per hour injected into the reactor through the agitator shaft bearing as a flush to prevent polymer product from collecting in and fouling the bearing.

Column 14 shows the amount of isobutane diverted from the amount in column 12 in pounds per hour added to the catalyst system feed (shown in column 9) to facilitate mixing of the catalyst system into the reaction mixture.

Column 15 shows the assumed rate of ethylene conversion.

Column 16 shows the rate at which polymer product is formed calculated from an assumed ethylene conversion of 100 percent, the ethylene feed rate, and the percent weight of ethylene shown in column 4.

Column 17 shows the percent conversion of butene-1 calculated from the polymer rate of column 16, and the butene-1 feed rate of column 11.

Column 18 shows the catalyst yield in thousands of pounds of polymer per pound of catalyst calculated from the polymer rate of column 16 and the catalyst system feed rate of column 9.

Column 19 shows the weight percent of ethylene feed based upon the total flow of ethylene and butene-1. Isobutane is not included in this calculation.

Column 20 shows the percent by weight of the butene-1 component in the mixed butene-1/isobutane feed stream. Ethylene is not included in this calculation.

Column 21 shows the temperature of the reaction mixture in degrees Fahrenheit.

Column 22 shows the temperature of the reaction mixture in degrees Centigrade.

Columns 23 through 27 show the calculated reactor effluents in weight percent for ethylene, isobutane, butene-1, polymer product, and catalyst system respectively.

Column 28 shows the calculated concentration of metallocene catalyst in the reactor effluent in parts per million.

Column 29 shows the fraction of the reaction volume that is gas bubbles, known as the "gas hold-up".

Column 30 shows the residence time in the reactor, taking into account bubble formation and effluent volume.

Column 31 shows the catalyst system concentration in moles/liter×10⁻⁵ in the effluent based on the volumetric flow of the effluent.

Column 32 shows the actual observed reaction mixture density.

Column 33 shows the total reaction volume, including bubbles, in gallons.

Column 34 shows the number of amps passing through the agitator motor.

Column 35 shows the rotation rate of the agitator in revolutions per minute.

Column 36 shows the energy in horsepower per thousand gallons of reaction mixture expended by the agitator.

Column 37 shows the pressure in the vapor space in pounds per square inch.

Column 38 shows the temperature in degrees Fahrenheit at the bottom of the reactor.

Column 39 shows the temperature in degrees Fahrenheit at the midpoint of the reactor (near, but still below, the top of the reaction mixture).

Column 40 shows the temperature in degrees Fahrenheit of the vapor space.

Columns 41 through 44 show the mole percent of nitrogen, ethylene, butene-1 and isobutane gas in the vapor space respectively.

Column 45 shows the liquid reflux in pounds per hour.

Column 46 shows the noncondensed gas recycle in pounds per hour.

Columns 47 through 50 show the percent weight in the noncondensed gas recycle of nitrogen, ethylene, butene-1, and isobutane respectively.

Column 51 shows the amount of noncondensable gas vented out of the reflux system in pounds per hour.

Column 52 shows the ratio of ethylene to isobutane in the vapor space as measured by gas chromatography.

Column 53 shows the ratio of butene-1 to isobutane in the vapor space as measured by gas chromatography.

Columns 54 through 57 show the weight fraction in the vapor space of nitrogen, ethylene, butene-1, and isobutane respectively.

Column 58 shows the volume of gas in ft.³/hr. passing through the vapor space, based on a compressibility factor of Z=0.83.

Columns 59 and 60 show the estimated kinematic viscosity in centistokes and the absolute viscosity in centipose of the reaction liquid respectively.

Columns 61 through 63 show the mole fractions of isobutane, butene-1, and polymer respectively in the reactor effluent.

Column 64 shows the weight ratio of butene-1 to ethylene in the feed.

Column 65 shows the weight ratio of butene-1 to ethylene in the vapor space.

Column 66 shows the ratio of the weight % of ethylene in the vapor space to that in the feed.

END OF EXAMPLES

Changes and modifications can be made by those skilled in the art to the embodiments as disclosed herein and such examples and illustrations are for explanatory purposes and are not intended to limit the scope of the claims.

TABLE 1

| Run No. 1 | Run ID 1 | Mn 2 | MWD 3 | C2= wt % 4 | % Vinyl-idene 5 | % Tri-Subst 6 | % Di-Subst 7 | % Vinyl 8 | Init cc/min 9 | Feed, lb/hr C2= 10 | Feed, lb/hr C4=1 11 | Feed, lb/hr iC40 12 | iC40 Flush lb/hr Agit 13 | Cat 14 | C2= Conv pct 15 |
|---|---|---|---|---|---|---|---|---|---|---|---|---|---|---|---|
| 1 | Low C2 = EB | 6860 | 2.28 | 17.8 | 70 | 20 | 3 | 6 | 9 | 30.0 | 311.9 | 464.2 | 19.8 | 49.9 | 100 |
| 2 | Low C2 = EB | 2810 | 2.08 | 18.3 | 72 | 26 | 2 | 0 | 10 | 30.0 | 311.9 | 466.4 | 20.0 | 50.0 | 100 |
| 3 | Low C2 = EB | 4547 | 2.40 | 18.5 | | | | | 10 | 30.0 | 311.9 | 487.0 | 19.9 | 45.6 | 100 |
| 4 | Low C2 = EB | 4956 | 2.40 | 19.8 | | | | | 9 | 28.0 | 312.0 | 450.3 | 19.6 | 38.7 | 100 |
| 5 | Low C2 = EB | 4461 | 2.41 | 23.6 | 69 | 27 | 3 | 1 | 2 | 15.0 | 156.0 | 254.6 | 20.0 | 50.0 | 100 |
| 6 | Low C2 = EB | 5449 | 2.29 | 23.9 | 64 | 31 | 4 | 1 | 9 | 27.0 | 311.9 | 491.4 | 18.2 | 45.3 | 100 |
| 7 | Mid C2 = EB | 4379 | 2.34 | 37.3 | | | | | 9 | 79.9 | 311.9 | 496.7 | 20.1 | 49.9 | 100 |
| 8 | Hi C2 = EB | 2078 | 2.17 | 37.4 | 70 | 29 | 1 | 0 | 6 | 54.0 | 129.9 | 217.6 | 16.6 | 40.6 | 100 |
| 9 | Hi C2 = EB | 2918 | 2.24 | 40.7 | 67 | 32 | 1 | 0 | 3.5 | 54.0 | 130.0 | 203.8 | 15.4 | 30.7 | 100 |
| 10 | Hi C2 = EB | 2881 | 2.23 | 42.3 | | | | | 14 | 130.0 | 308.0 | 515.4 | 25.3 | 54.7 | 100 |
| 11 | Hi C2 = EB | 3934 | 2.49 | 44.1 | | | | | 9 | 129.9 | 312.0 | 459.7 | 19.9 | 50.0 | 100 |
| 12 | Hi C2 = EB | 4200 | 2.39 | 44.7 | 62 | 32 | 3 | 3 | 9 | 130.0 | 312.0 | 497.5 | 25.4 | 54.7 | 100 |
| 13 | Hi C2 = EB | 3483 | 2.32 | 45.5 | 65 | 34 | 2 | 0 | 12 | 130.0 | 272.7 | 500.7 | 24.5 | 54.7 | 100 |
| 14 | Hi C2 = EB | 8861 | 2.48 | 55.3 | 52 | 41 | 4 | 3 | 4 | 130.0 | 312.2 | 489.4 | 20.0 | 50.0 | 100 |

| Poly Rate lb/hr 16 | C4=1 Conv pct 17 | Cat Yield Klbs/lb 18 | wt % C2= 19 | wt % C4=1 20 | Temp degF 21 | Temp degC 22 | Reactor Effluent, wt % C2= 23 | iC40 24 | C4=1 25 | Poly 26 | Cat 27 | Cat Conc ppm 28 | Gas Holdup vol fr 29 | Liquid Res Time mins 30 | Cat Conc ×10-5M 31 | React Dens lb/ft3 32 | React Total Vol gals 33 |
|---|---|---|---|---|---|---|---|---|---|---|---|---|---|---|---|---|---|
| 168.8 | 44.8 | 105 | 8.6 | 39.9 | 143.8 | 62.1 | 0.0 | 57.8 | 21.2 | 20.9 | 0.13 | 2.0 | 0.134 | 43.5 | 0.25 | 31.5 | 139.3 |
| 163.9 | 43.2 | 92 | 8.6 | 39.8 | 175.3 | 79.6 | 0.0 | 57.9 | 21.7 | 20.2 | 0.14 | 2.2 | 0.060 | 43.6 | 0.26 | 32.3 | 136.5 |
| 161.1 | 42.5 | 91 | 8.6 | 38.8 | 158.4 | 70.2 | 0.0 | 58.9 | 21.5 | 19.5 | 0.14 | 2.1 | 0.093 | 42.5 | 0.26 | 31.9 | 137.9 |
| 141.5 | 36.6 | 88 | 8.1 | 40.7 | 158.3 | 70.2 | 0.0 | 57.2 | 24.8 | 17.9 | 0.13 | 2.0 | 0.091 | 44.4 | 0.25 | 31.7 | 138.1 |
| 63.7 | 31.5 | 178 | 8.6 | 37.6 | 176.6 | 80.3 | 0.0 | 60.1 | 24.8 | 15.0 | 0.05 | 0.8 | 0.248 | 68.7 | 0.10 | 25.0 | 146.1 |

TABLE 1-continued

| 112.9 | 27.7 | 70 | 7.8 | 38.6 | 161.6 | 72.0 | 0.0 | 59.4 | 26.9 | 13.6 | 0.12 | 1.9 | 0.056 | 42.4 | 0.23 | 32.0 | 137.5 |
|---|---|---|---|---|---|---|---|---|---|---|---|---|---|---|---|---|---|
| 214.2 | 43.4 | 133 | 19.3 | 38.3 | 176.2 | 80.1 | 0.0 | 56.1 | 19.7 | 24.1 | 0.12 | 1.8 | 0.218 | 33.4 | 0.22 | 27.4 | 134.9 |
| 144.1 | 70.1 | 134 | 27.2 | 37.0 | 203.9 | 95.5 | 0.0 | 54.4 | 9.6 | 35.8 | 0.17 | 2.6 | 0.287 | 70.7 | 0.33 | 25.6 | 138.4 |
| 132.7 | 61.1 | 212 | 27.2 | 38.6 | 207.8 | 97.7 | 0.0 | 52.8 | 12.9 | 34.2 | 0.10 | 1.6 | 0.027 | 79.5 | 0.20 | 34.5 | 111.6 |
| 307.3 | 58.0 | 123 | 27.4 | 37.1 | 206.7 | 97.1 | 0.0 | 54.2 | 13.4 | 32.2 | 0.17 | 2.6 | 0.000 | 32.0 | 0.32 | 37.4 | 108.6 |
| 294.3 | 53.2 | 183 | 27.2 | 40.0 | 204.7 | 95.9 | 0.0 | 51.3 | 16.0 | 32.6 | 0.11 | 1.8 | 0.055 | 33.8 | 0.22 | 33.4 | 113.9 |
| 290.6 | 51.9 | 181 | 27.2 | 38.3 | 203.6 | 95.3 | 0.0 | 53.1 | 15.8 | 30.9 | 0.11 | 1.7 | 0.000 | 32.1 | 0.21 | 37.7 | 107.8 |
| 285.3 | 57.5 | 133 | 29.6 | 34.9 | 200.0 | 93.3 | 0.0 | 55.6 | 12.7 | 31.5 | 0.15 | 2.3 | 0.000 | 34.8 | 0.29 | 36.6 | 111.4 |
| 234.9 | 34.0 | 329 | 27.2 | 38.6 | 205.1 | 96.2 | 0.0 | 52.8 | 21.9 | 25.2 | 0.05 | 0.8 | 0.128 | 33.0 | 0.09 | 29.4 | 130.6 |

| | | | Vapor Space | Reactor Temps | | | Vapor Composition | | | | Liquid | Gas | Recycle Gas Composition | | | | Vent |
|---|---|---|---|---|---|---|---|---|---|---|---|---|---|---|---|---|---|
| Agit amps 34 | Agit RPM 35 | HP/ KGAL 36 | Press psig 37 | Btm degF 38 | Mid degF 39 | Vap degF 40 | N2 mol % 41 | C2= mol % 42 | C4 = 1 mol % 43 | iC40 mol % 44 | Reflux lb/hr 45 | Recycle lb/hr 46 | N2 wt % 47 | C2= wt % 48 | C4 = 1 wt % 49 | iC40 wt % 50 | Gas lb/hr 51 |
| 2.44 | 300 | 9.6 | 153.5 | 143.8 | 143.9 | 146.6 | 13.7 | 5.6 | 22.5 | 58.1 | 36.3 | 80.6 | 40 | 17 | 7 | 36 | 15.6 |
| 2.26 | 300 | 9.1 | 205.2 | 175.3 | 176.6 | 178.0 | 6.9 | 3.0 | 22.0 | 66.6 | 369.9 | 94.5 | 27 | 12 | 9 | 53 | 15.9 |
| 2.44 | 300 | 9.5 | 178.5 | 158.4 | 159.3 | 160.9 | 11.1 | 4.5 | 22.4 | 60.8 | 104.2 | 85.6 | 40 | 17 | 7 | 36 | 15.8 |
| 2.36 | 300 | 9.4 | 178.4 | 158.3 | 159.2 | 160.7 | 10.7 | 5.7 | 26.6 | 56.5 | 87.2 | 85.6 | 38 | 21 | 8 | 32 | 17.3 |
| 3.83 | 425 | 25.1 | 224.6 | 176.6 | 177.8 | 178.1 | 9.0 | 7.0 | 31.4 | 52.1 | | 103.0 | | | | | 5.1 |
| 2.37 | 300 | 9.1 | 183.0 | 161.6 | 162.9 | 163.6 | 7.5 | 8.2 | 30.1 | 53.9 | 124.2 | 89.0 | | | | | 34.2 |
| 2.17 | 300 | 9.5 | 221.5 | 176.2 | 175.7 | 180.0 | 7.5 | 3.6 | 19.1 | 68.2 | | 105.6 | | | | | 4.0 |
| 3.66 | 425 | 29.2 | 275.3 | 203.9 | 203.6 | 206.6 | 4.9 | 2.2 | 11.1 | 78.9 | | 101.7 | | | | | 7.0 |
| 3.80 | 425 | 35.0 | 320.3 | 207.8 | 207.4 | 209.6 | 8.7 | 4.6 | 17.5 | 68.1 | | 119.3 | | | | | 5.3 |
| 2.52 | 300 | 12.3 | 318.3 | 206.7 | 201.5 | 207.5 | 10.4 | 4.6 | 15.1 | 68.5 | | 121.4 | | | | | 4.2 |
| 4.37 | 425 | 33.9 | 321.8 | 204.7 | 201.4 | 206.5 | 9.3 | 7.1 | 20.8 | 61.7 | | 115.6 | | | | | 10.4 |
| 2.43 | 300 | 12.2 | 322.1 | 203.6 | 199.5 | 204.4 | 11.5 | 7.0 | 18.9 | 62.6 | | 121.4 | | | | | 1.2 |
| 4.41 | 425 | 34.5 | 315.8 | 200.0 | 195.9 | 201.7 | 13.1 | 4.9 | 13.3 | 67.1 | | 119.6 | 55 | 17 | 3 | 25 | 0.0 |
| 4.09 | 425 | 27.4 | 322.2 | 205.1 | 203.5 | 206.7 | 2.8 | 16.2 | 27.4 | 52.7 | | 120.8 | | | | | 68.7 |

| Vapor GC | | Reactor Vapor Comp | | | | Total Gas | Est'd Liquid | Est'd Liquid | | | | | | |
|---|---|---|---|---|---|---|---|---|---|---|---|---|---|---|
| C2=/iC40 52 | C4 = 1/iC40 53 | N2 wt fr 54 | C2= wt fr 55 | C4 = 1 wt fr 56 | iC40 wt fr 57 | ft3/hr (z = .83) 58 | Kin Vis cSt 59 | Visc cP 60 | iC40 mol fr 61 | C4 = 1 mol fr 62 | Poly mol fr 63 | Rfd 64 | Rvp 65 | % C2vp/ % C2fd 66 |
| 0.096 | 0.387 | 0.07 | 0.03 | 0.24 | 0.65 | 168.8 | 3.6 | 2.13 | 0.723 | 0.275 | 0.002 | 10.40 | 8.08 | 0.81 |
| 0.044 | 0.331 | 0.04 | 0.02 | 0.23 | 0.72 | 192.9 | 1.2 | 0.68 | 0.716 | 0.279 | 0.005 | 10.40 | 14.89 | 0.42 |
| 0.075 | 0.369 | 0.06 | 0.02 | 0.24 | 0.68 | 150.6 | 1.3 | 0.75 | 0.724 | 0.273 | 0.003 | 10.40 | 9.91 | 0.67 |
| 0.101 | 0.470 | 0.06 | 0.03 | 0.28 | 0.63 | 150.6 | 1.2 | 0.70 | 0.688 | 0.309 | 0.003 | 11.14 | 9.32 | 0.86 |
| 0.134 | 0.603 | 0.05 | 0.04 | 0.34 | 0.58 | 89.7 | 0.6 | 0.30 | 0.699 | 0.299 | 0.002 | 10.40 | 9.03 | 1.06 |
| 0.152 | 0.558 | 0.04 | 0.04 | 0.32 | 0.60 | 146.2 | 0.8 | 0.44 | 0.679 | 0.319 | 0.002 | 11.55 | 7.33 | 1.35 |
| 0.052 | 0.280 | 0.04 | 0.02 | 0.20 | 0.74 | 183.4 | 2.2 | 1.29 | 0.730 | 0.266 | 0.004 | 3.90 | 10.71 | 0.21 |
| 0.028 | 0.141 | 0.03 | 0.01 | 0.12 | 0.85 | 111.9 | 2.2 | 1.32 | 0.833 | 0.152 | 0.015 | 2.41 | 10.04 | 0.09 |
| 0.068 | 0.256 | 0.05 | 0.02 | 0.18 | 0.75 | 159.5 | 2.8 | 1.67 | 0.790 | 0.200 | 0.010 | 2.41 | 7.55 | 0.18 |
| 0.067 | 0.220 | 0.06 | 0.02 | 0.16 | 0.76 | 136.3 | 2.2 | 1.32 | 0.788 | 0.203 | 0.009 | 2.37 | 6.55 | 0.18 |
| 0.115 | 0.336 | 0.05 | 0.04 | 0.22 | 0.69 | 168.8 | 3.8 | 2.27 | 0.750 | 0.243 | 0.007 | 2.40 | 5.83 | 0.27 |
| 0.112 | 0.302 | 0.06 | 0.04 | 0.20 | 0.70 | 159.1 | 3.5 | 2.04 | 0.759 | 0.235 | 0.006 | 2.40 | 5.42 | 0.27 |
| 0.073 | 0.198 | 0.07 | 0.03 | 0.14 | 0.76 | 172.6 | 3.1 | 1.85 | 0.803 | 0.189 | 0.008 | 2.10 | 5.42 | 0.19 |
| 0.308 | 0.519 | 0.02 | 0.09 | 0.30 | 0.60 | 217.6 | 5.5 | 3.10 | 0.698 | 0.300 | 0.002 | 2.40 | 3.37 | 0.64 |

What is claimed is:

1. A process for continuously producing copolymer comprising polymerizing ethylene and α-olefin monomers in the presence of a metallocene catalyst system and in a reaction zone containing liquid phase which comprises:

(A) continuously providing a dilute liquefied α-olefin feed stream from a refinery or a steam cracking plant comprising at least one α-olefin reactant and diluent admixed therewith wherein the amount of diluent in said feed stream is at least 30 weight percent thereof wherein said stream is selected from those which contain butene-1, propylene or $C_5$ α-olefin;

(B) providing a feed stream comprising ethylene in liquid, vapor, or liquid/vapor form;

(C) admixing, the feed streams of steps (A) and (B) in amounts sufficient to provide a reactant feed stream having an α-olefin/ethylene weight ratio effective to yield a co-polymer containing between about 5 to about 70 weight percent units from ethylene;

(D) continuously introducing reactant feed stream derived in accordance with step (C) and metallocene catalyst system into the liquid phase of the reaction zone in a manner and under conditions sufficient to:

(i) polymerize the ethylene and α-olefin to obtain a polymer product having a number average molecular weight of from about 300 to about 15,000;

(ii) obtain an α-olefin conversion of at least 30%;

(iii) obtain an ethylene conversion of at least 70%

(E) continuously withdrawing copolymer product from the reactor.

2. The process of claim 1 wherein at least 50 weight % of the constituents of said diluent possess a boiling point under reaction conditions within about ±20° C. of the average boiling point of the α-olefin constituents of the feed stream.

3. The process of claim 1 wherein the contents of the reaction zone are maintained at a temperature above the critical temperature of ethylene and below the critical temperature of the α-olefin reactants.

4. The process of claim 1 wherein the polymerizable α-olefin monomer is selected from the group consisting of butene-1, propylene, and pentene-1.

5. The process of claim 4 wherein the polymerizable α-olefin is butene-1 and the diluent comprises other $C_4$ hydrocarbons.

6. The process of claim 4 wherein the polymerizable α-olefin is propylene and the diluent comprises other $C_3$ hydrocarbons.

7. The process of claim 1 wherein number average molecular weight of the copolymer is controlled to be from about 900 to about 8,000, the ethylene conversion is at least about 80% and the α-olefin conversion is at least 40%.

8. The process of claim 7 wherein the process is conducted to obtain copolymer having from about 11 to about 70 wt % units from ethylene.

9. The process of claim 1 wherein the reaction temperature is controlled by evaporative cooling.

10. The process of claim 1 wherein the evaporative cooling is achieved by internal reflux.

11. The process of claim 1 wherein the evaporative cooling is achieved by external reflux.

12. The process of claim 1 wherein reaction temperature is controlled by external or internal cooling means.

13. The process of claim 1 wherein the liquid phase is continuously and vigorously mixed with a means selected from the group consisting of impeller and jet pump.

14. The process of claim 1 wherein the weight ratio of said metallocene catalyst system utilized to said copolymer product produced is from about $1\times10^{-4}$ to about $7\times10^{-4}$.

15. A process for continuously producing copolymer comprising polymerizing ethylene and α-olefin monomers in the presence of a metallocene catalyst system in an evaporatively cooled reactor containing vapor phase and liquid phase which comprises:

(A) continuously providing a dilute liquefied α-olefin feed stream from a refinery or a steam cracking plant comprising at least one α-olefin reactant and diluent admixed therewith wherein said stream is selected from those which contain butene-1, propylene or $C_5$ α-olefin;
  (i) the amount of diluent in said feed stream is at least 30 weight percent thereof; and
  (ii) at least 50 weight percent of the constituents of said diluent possess a boiling point under reaction conditions within about ±20° C. of the average boiling point of the α-olefin constituents of the feed stream;

(B) providing an ethylene feed stream in liquid, vapor, or liquid/vapor form;

(C) admixing, the feed streams of steps (A) and (B) to provide a reactant feed stream;

(D) continuously introducing reactant feed stream derived in accordance with step (C) and metallocene catalyst system into the liquid phase of the evaporatively cooled reactor in a manner and under conditions sufficient to polymerize ethylene and α-olefin at a rate such that the ratio of the weight % of ethylene in the vapor phase to the weight % of ethylene in the reactant feed stream is no more than about 1.2;

(E) continuously at least partially condensing the vapor above the liquid phase and returning the condensate to the liquid phase;

(F) continuously withdrawing copolymer product from the reactor.

16. The process of claim 15, wherein said ratio of step (D) is less than 1.

17. The process of claim 15 further comprising: removing polar compounds from the refinery stream prior to introduction to said reactor.

18. The process of claim 17, wherein said polar compounds are removed by fractional distillation of said refinery stream.

19. The process of claim 17, wherein said polar compounds are removed and said refinery stream is concentrated by fractional distillation.

20. The process of claim 17 further comprising removing dienes from the refinery stream prior to introducing the stream into said reactor.

21. The process of claim 20, wherein said dienes are removed by hydrogenation.

22. The process of claim 15 wherein the amount of ethylene and α-olefin present in the reactant feed stream is effective to yield copolymer containing from about 11 to about 70 weight percent units from ethylene.

23. The process of claim 22 wherein the number average molecular weight of the copolymer is controlled to be from about 900 to about 8,000.

24. The process of claim 23 wherein the copolymer number average molecular weight is controlled to be from about 1,000 to about 5,000.

25. The process of claim 15 wherein the α-olefin is butene-1 and the diluent comprises at least one of butane, isobutane, n-butane and butene-2.

26. A process for continuously producing copolymer comprising polymerizing ethylene and α-olefin monomers in the presence of a metallocene catalyst system, comprising:

(A) continuously providing a dilute liquefied α-olefin feed stream from a refinery or it steam cracking plant comprising at least one α-olefin reactant and diluent admixed therewith, wherein said stream is selected from those which contain butene-1, propylene or $C_5$ α-olefin, wherein:
  (i) the amount of diluent in said feed stream is about 30 weight percent thereof; and
  (ii) about 50 weight percent of the constituents of said diluent possess a boiling point under reaction conditions within about ±20° C. of the average boiling point of the α-olefin constituents of the feed stream;

(B) providing a feed stream comprising ethylene in liquid, vapor, or liquid/vapor form;

(C) continuously introducing the feed streams of steps (A) and (B) and metallocene catalyst system into the liquid phase of a reaction zone in a manner and under conditions sufficient to:
  (i) obtain an α-olefin conversion of about 30%,
  (ii) obtain an ethylene conversion of about 70%; and (D) continuously withdrawing copolymer product from the reactor.

27. The process of claim 26 wherein the reaction temperature is maintained at or below the critical temperature of the α-olefin having the highest critical temperature.

28. The process of claim 1, 15, or 26 wherein the reaction temperature is maintained by evaporative cooling and refluxing and the concentration of ethylene in the reflux is less than that in the combined feeds.

29. The process of claim 26 wherein the amount of diluent in said feed stream is about 40 weight percent thereof.

30. The process of claim 26 wherein the amount of diluent in said feed stream is about 50 weight percent thereof.

* * * * *